US012746455B2

(12) United States Patent
Moll et al.

(10) Patent No.: US 12,746,455 B2
(45) Date of Patent: Sep. 29, 2026

(54) AUGMENTED REALITY PHYSICAL CARD GAMES

(71) Applicant: Snap Inc., Santa Monica, CA (US)

(72) Inventors: Sharon Moll, Lachen (CH); Pawel Wawruch, Yverdon-les-Bains (CH); Piotr Gurgul, Hergiswil (CH)

(73) Assignee: Snap Inc., Santa Monica, CA (US)

( * ) Notice: Subject to any disclaimer, the term of this patent is extended or adjusted under 35 U.S.C. 154(b) by 830 days.

(21) Appl. No.: 18/050,381

(22) Filed: Oct. 27, 2022

(65) Prior Publication Data

US 2024/0139611 A1 May 2, 2024

(51) Int. Cl.

*A63F 1/04* (2006.01)
*A63F 1/02* (2006.01)
*G06F 3/01* (2006.01)
*A63F 1/00* (2006.01)

(52) U.S. Cl.

CPC .................. *A63F 1/04* (2013.01); *A63F 1/02* (2013.01); *G06F 3/011* (2013.01); *G06F 3/017* (2013.01); *A63F 2001/008* (2013.01); *A63F 2001/022* (2013.01); *A63F 2001/0491* (2013.01)

(58) Field of Classification Search

None
See application file for complete search history.

(56) References Cited

U.S. PATENT DOCUMENTS 7,971,156 B2 6/2011 Albertson et al.
7,996,793 B2 8/2011 Latta et al.
8,152,637 B2 * 4/2012 Watanabe ............... A63F 13/52 463/31
8,487,938 B2 7/2013 Latta et al.
8,856,691 B2 10/2014 Geisner et al.
(Continued)

FOREIGN PATENT DOCUMENTS

CN 103049761 8/2016
EP 3707693 9/2020
(Continued)

OTHER PUBLICATIONS

"International Application Serial No. PCT/US2023/035928, International Preliminary Report on Patentability mailed May 8, 2025", 11 pgs.

(Continued)

*Primary Examiner* — Tramar Harper
(74) *Attorney, Agent, or Firm* — Schwegman Lundberg & Woessner, P.A.

(57) ABSTRACT

Systems, methods, and computer readable media for augmented reality (AR) physical card games. Examples capture an image of a user view of a real-world scene and process the image to determine the locations and codes of physical cards within the image. Overlays are determined for the cards based on the codes. An AR graphics component displays on a display of an AR wearable device the overlays adjusted in accordance with the user view. The overlays may be images, animations, or videos. A card game is downloaded onto the AR wearable device. The card game includes rules that keep track of a score, assist with play, and insure fair play. The card game includes user interfaces that may be shared among the players. Methods include manufacturing the playing cards with computer-readable codes to identify the cards.

20 Claims, 16 Drawing Sheets

(56) References Cited

U.S. PATENT DOCUMENTS

| | | | | |
|---|---|---|---|---|
| 9,225,897 | B1 | 12/2015 | Sehn et al. | |
| 9,230,160 | B1 | 1/2016 | Kanter | |
| 9,276,886 | B1 | 3/2016 | Samaranayake | |
| 9,705,831 | B2 | 7/2017 | Spiegel | |
| 9,742,713 | B2 | 8/2017 | Spiegel et al. | |
| 10,102,423 | B2 | 10/2018 | Shaburov et al. | |
| 10,284,508 | B1 | 5/2019 | Allen et al. | |
| 10,439,972 | B1 | 10/2019 | Spiegel et al. | |
| 10,509,466 | B1 | 12/2019 | Miller et al. | |
| 10,514,876 | B2 | 12/2019 | Sehn | |
| 10,579,869 | B1 | 3/2020 | Xiong et al. | |
| 10,614,855 | B2 | 4/2020 | Huang | |
| 10,748,347 | B1 | 8/2020 | Li et al. | |
| 10,958,608 | B1 | 3/2021 | Allen et al. | |
| 10,962,809 | B1 | 3/2021 | Castañeda | |
| 10,996,846 | B2 | 5/2021 | Robertson et al. | |
| 10,997,787 | B2 | 5/2021 | Ge et al. | |
| 11,012,390 | B1 | 5/2021 | Al Majid et al. | |
| 11,030,454 | B1 | 6/2021 | Xiong et al. | |
| 11,036,368 | B1 | 6/2021 | Al Majid et al. | |
| 11,062,498 | B1 | 7/2021 | Voss et al. | |
| 11,087,728 | B1 | 8/2021 | Canberk et al. | |
| 11,092,998 | B1 | 8/2021 | Castañeda et al. | |
| 11,106,342 | B1 | 8/2021 | Al Majid et al. | |
| 11,126,206 | B2 | 9/2021 | Meisenholder et al. | |
| 11,143,867 | B2 | 10/2021 | Rodriguez, II | |
| 11,169,600 | B1 | 11/2021 | Canberk et al. | |
| 11,227,626 | B1 | 1/2022 | Krishnan Gorumkonda et al. | |
| 11,307,747 | B2 | 4/2022 | Dancie et al. | |
| 11,531,402 | B1 | 12/2022 | Stolzenberg | |
| 11,546,505 | B2 | 1/2023 | Canberk | |
| 2003/0062675 | A1* | 4/2003 | Noro | G06F 3/011 273/237 |
| 2006/0073892 | A1* | 4/2006 | Watanabe | A63F 13/52 463/34 |
| 2009/0012788 | A1 | 1/2009 | Gilbert et al. | |
| 2011/0301934 | A1 | 12/2011 | Tardif | |
| 2012/0083325 | A1* | 4/2012 | Heatherly | A63F 13/46 463/31 |
| 2012/0218298 | A1* | 8/2012 | Hayakawa | A63F 13/655 345/633 |
| 2013/0083066 | A1* | 4/2013 | Aoki | G06V 20/20 345/633 |
| 2013/0123009 | A1* | 5/2013 | Maharbiz | A63F 3/00643 463/31 |
| 2014/0121015 | A1* | 5/2014 | Massing | G07F 17/3211 463/31 |
| 2014/0171036 | A1 | 6/2014 | Simmons | |
| 2015/0120293 | A1 | 4/2015 | Wohlert et al. | |
| 2015/0370320 | A1 | 12/2015 | Connor | |
| 2016/0078683 | A1* | 3/2016 | Sudol | G06T 19/006 345/633 |
| 2016/0361642 | A1* | 12/2016 | Linden | A63F 1/02 |
| 2017/0123487 | A1 | 5/2017 | Hazra et al. | |
| 2017/0277684 | A1 | 9/2017 | Dharmarajan Mary | |
| 2017/0277685 | A1 | 9/2017 | Takumi | |
| 2017/0326462 | A1* | 11/2017 | Lyons | G07F 17/3293 |
| 2017/0351910 | A1 | 12/2017 | Elwazer et al. | |
| 2018/0043259 | A1* | 2/2018 | Wong | A63F 13/5255 |
| 2018/0158370 | A1 | 6/2018 | Pryor | |
| 2018/0214767 | A1 | 8/2018 | Oh | |
| 2020/0001168 | A1* | 1/2020 | Gerhard | G06K 19/06037 |
| 2020/0043233 | A1* | 2/2020 | Nelson | G06F 3/011 |
| 2020/0067998 | A1* | 2/2020 | Pilnock | A63F 13/77 |
| 2020/0285854 | A1 | 9/2020 | Merchant et al. | |
| 2021/0011612 | A1 | 1/2021 | Dancie et al. | |
| 2021/0074016 | A1 | 3/2021 | Li et al. | |
| 2021/0166732 | A1 | 6/2021 | Shaburova et al. | |
| 2021/0174034 | A1 | 6/2021 | Retek et al. | |
| 2021/0241529 | A1 | 8/2021 | Cowburn et al. | |
| 2021/0303075 | A1 | 9/2021 | Cowburn et al. | |
| 2021/0303077 | A1 | 9/2021 | Anvaripour et al. | |
| 2021/0303140 | A1 | 9/2021 | Mourkogiannis | |
| 2021/0382564 | A1 | 12/2021 | Blachly et al. | |
| 2021/0397000 | A1 | 12/2021 | Rodriguez, II | |
| 2021/0405761 | A1 | 12/2021 | Canberk | |
| 2022/0188539 | A1 | 6/2022 | Chan et al. | |
| 2022/0206588 | A1 | 6/2022 | Canberk et al. | |
| 2022/0300730 | A1 | 9/2022 | Eirinberg et al. | |
| 2022/0300731 | A1 | 9/2022 | Eirinberg et al. | |
| 2022/0326781 | A1 | 10/2022 | Hwang et al. | |
| 2022/0334649 | A1 | 10/2022 | Hwang et al. | |
| 2023/0010603 | A1* | 1/2023 | Shigeta | A63F 13/35 |

FOREIGN PATENT DOCUMENTS

| | | | | |
|---|---|---|---|---|
| JP | 2014155861 A * | 8/2014 | | |
| JP | 5925347 B1 * | 5/2016 | G06F 3/048 | |
| JP | 2016093521 A * | 5/2016 | | |
| KR | 20110110379 A | 10/2011 | | |
| KR | 20170047943 A * | 5/2017 | A63F 3/00643 | |
| KR | 20220158824 | 12/2022 | | |
| WO | WO-2013141349 A1 * | 9/2013 | A63F 13/95 | |
| WO | 2016168591 | 10/2016 | | |
| WO | WO-2017069396 A1 * | 4/2017 | A63F 1/04 | |
| WO | 2019094618 | 5/2019 | | |
| WO | 2022005687 | 1/2022 | | |
| WO | 2022005693 | 1/2022 | | |
| WO | 2022060549 | 3/2022 | | |
| WO | 2022066578 | 3/2022 | | |
| WO | 2022132381 | 6/2022 | | |
| WO | 2022146678 | 7/2022 | | |
| WO | 2022198182 | 9/2022 | | |
| WO | 2022216784 | 10/2022 | | |
| WO | 2022225761 | 10/2022 | | |
| WO | 2022245765 | 11/2022 | | |

OTHER PUBLICATIONS

"International Application Serial No. PCT/US2023/035928, International Search Report mailed Feb. 9, 2024", 5 pgs.

"International Application Serial No. PCT/US2023/035928, Written Opinion mailed Feb. 9, 2024", 9 pgs.

"The Eye of Judgment", Wikipedia, (Oct. 7, 2022).

Haruhiro, Katayose, "ARMS: A Trading Card Game using AR Technology", Proceedings of the 2005 ACM Sigchi International Conference on Advances In Computer Entertainment Technology, Ace '05, Acm Press, New York, New York, USA, (Jun. 15, 2005), 354-355.

Hidehiko, Okada, et al., "Application and evaluation of augmented reality user interface to a card game Scopa", Sice Annual Conference (SICE), 2011 Proceedings of, IEEE, (Sep. 13, 2011), 2127-2130.

Kuchera, Ben, "Let your geek flag fly: a review of Eye of Judgment / Ars Technica", [Online]. Retrieved from the Internet: <https://arstechnica.com/gaming/2007/10/eyeofjudgment-ars>, (Oct. 24, 2007).

Myojin, Seiko, et al., "Augmented reality card game based on user-specific information control", Theory of Computing, ACM, 2 Penn Plaza, Suite 701 New York NY 10121-0701 USA, (Oct. 29, 2012), 1193-1196.

"European Application Serial No. 23809814.9, Response to Communication pursuant to Rules 161(1) and 162 EPC filed Nov. 24, 2025", 20 pgs.

* cited by examiner

AUGMENTED REALITY PHYSICAL CARD GAMES

TECHNICAL FIELD

Examples of the present disclosure relate generally to enabling players to play a variety of card games with a single deck of physical cards. More particularly, but not by way of limitation, examples of the present disclosure relate to identifying physical cards based on identifying codes printed on the physical cards and displaying on a display of an augmented reality (AR) device an overlay that transforms the physical card, as seen by a user, into a card of a card game.

BACKGROUND

Users increasingly want virtual reality (VR), mixed reality (MR), and augmented reality (AR) wearable devices to operate in a more user-friendly manner with more functions. However, often, the wearable devices have very little room for interface controls on the wearable devices and often the AR wearable devices have limited power to provide additional functions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
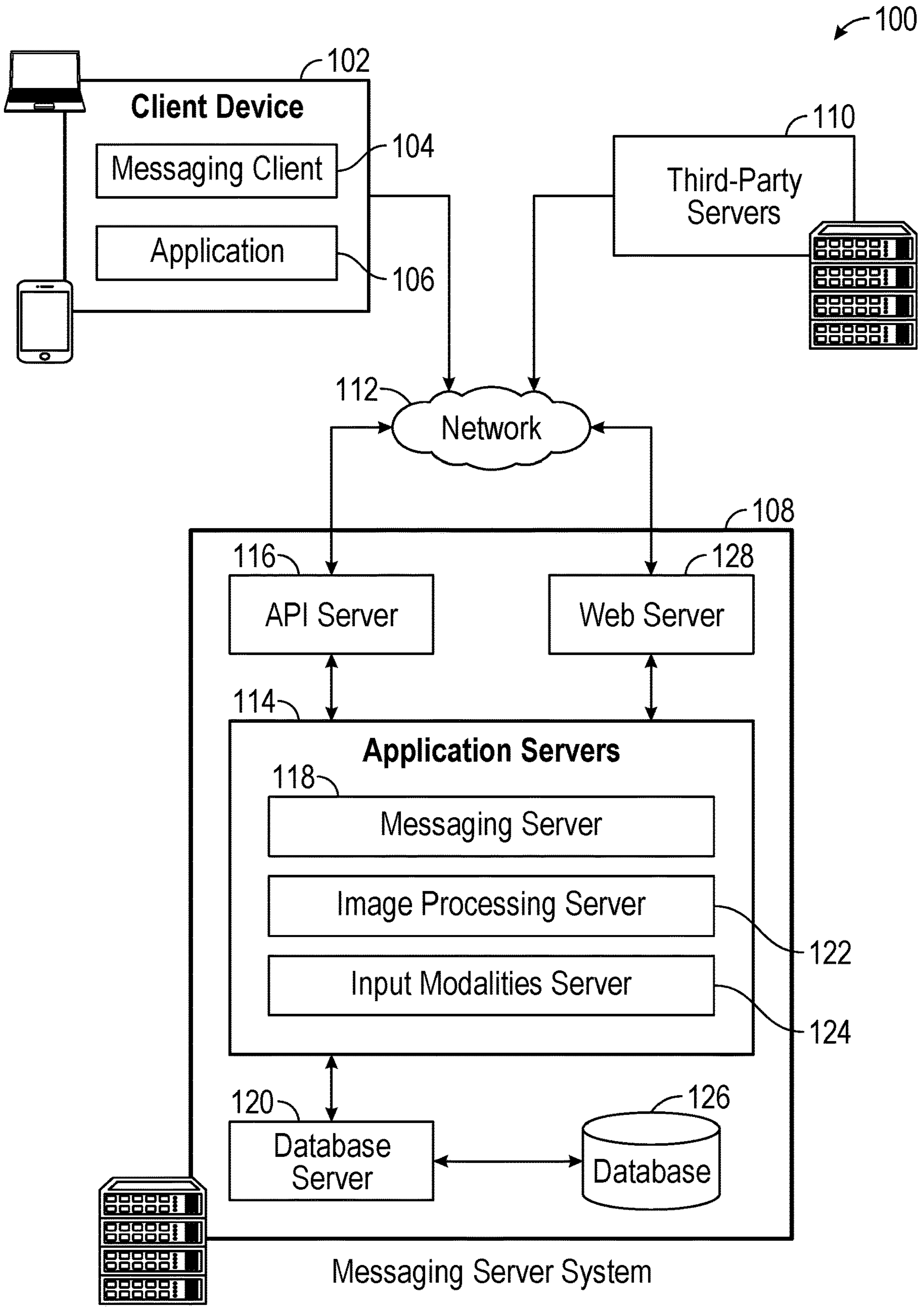
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The term AR wearable device is used as an illustrative device; however, one skilled in the art will recognize that the methods, systems, and computer readable medium disclosed herein are applicable to other wearable devices or non-wearable devices including VR devices and MR devices.

The AR wearable devices 602 such as AR glasses 1200 have limited physical user interface items. For example, AR glasses 1200 have one or two buttons 1278 and a touchpad 1276 that the user 698 interacts with on a frame 1232 of the AR glasses 1200. Moreover, the AR glasses 1200 have limited battery power, memory, and processing capability.

Often fully simulated card games on AR wearable device 602 provide a poor user experience because it is difficult to accurately track hands on AR wearable devices 602 because the processing required to accurately track hands is often greater than can be provided by the AR wearable device 602.

One challenge is how to provide a better user experience for card games using an AR wearable device 602. The challenge is addressed, referring to FIG. 6, by using physical cards 682 with codes 684 that can be used by the AR wearable device 602 to uniquely identify the card 682. The AR wearable device 602 creates a card assignment 624 between the codes 684 and overlays 644 that are part of a game 634. For example, one game 634 such as poker uses standard 52 playing cards 682 with four suits and thirteen ranks from two to ace, so the game 634 has fifty-two overlays 644 and fifty-two different codes 684 on the cards 682. Another game 634 uses tarot cards with seventy-eight cards 682 in a deck of tarot cards 682, so the game 634 has seventy-eight overlays 644 with seventy-eight codes 684. The game module 654 processes images 648 captured by the AR wearable device 602 to determine card locations 646 and the code 652 on a card 682. The AR wearable device 602 than adjusts the overlays 644 and displays the overlays 644 on a display 608 of the AR wearable device 602. The user 698 of the AR wearable device 602 sees the overlays 644 fit to the surface of the cards 682. The card assignment 624 is shared by a "host" AR wearable device 602 with other "guest" AR wearable devices 692 so that the other users 622 also see the cards 682 transformed by their respective AR wearable device 692. The overlays 644 may be images, animations, videos, and so forth. Often, the user 698 finds the user experience to be better with the physical cards 682 that provide haptic interaction compared with fully virtual card games.

Additionally, remote users 622 may participate in the game 634 by remotely connecting to a session 620 created by the "host" AR wearable device 602. The card assignment 624 and updates to play are shared. In some examples, audio contact is maintained among remote users 622. The game 634 may be downloaded by, for example, a quick response (QR) code or another method. The codes 684 on the cards 682 may be QR codes to download different games 634. The games 634 may be a high-level language script language and may access through an application programming interface (API) information relating to the cards 682, input of the user 698, and the user 698. The games 634 may include rules 636 that are triggered by events 642. For example, an event 642 may be that a card 682 was played and the rule 636 may include a condition 638 such as was it the turn of the user 698. If it was not the turn of the user 698, then an action 640 associated with the condition 638 is triggered where the AR wearable device 602 is to indicate to the user 698 that it was not a valid play of the card 682. Moreover, the game 634 may include user interfaces (UI) 643 to be presented to the user 698 while playing the game 634. The UIs 643 may be shared among all the players and appear to be placed in a common space such as on a table where the card game 634 is being played.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and an input modalities server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The input modalities server 124 supports input modalities for AR wearable devices. The input modalities server 124 receives requests from an AR wearable device and responds to the requests. The requests include sensor data such as an image being sent to the input modalities server 124 for processing. The input modalities server 124 processes the sensor data and identifies objects within the sensor data and returns names of the objects and positions of the objects within the sensor data to the AR wearable device. Another request from the AR wearable device is for AR applications associated with tags such as "QR code" that may be run on the AR wearable device. The input modalities server 124 may load the AR wearable device with AR applications that are likely to be used by a user of the AR wearable device or respond with AR applications based on criteria given to the input modalities server 124 from the AR wearable device. The criteria may be as a limit on the number of AR applications, preferences of the user such as AR applications with links back to the messaging system 100, and so forth.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a j son file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
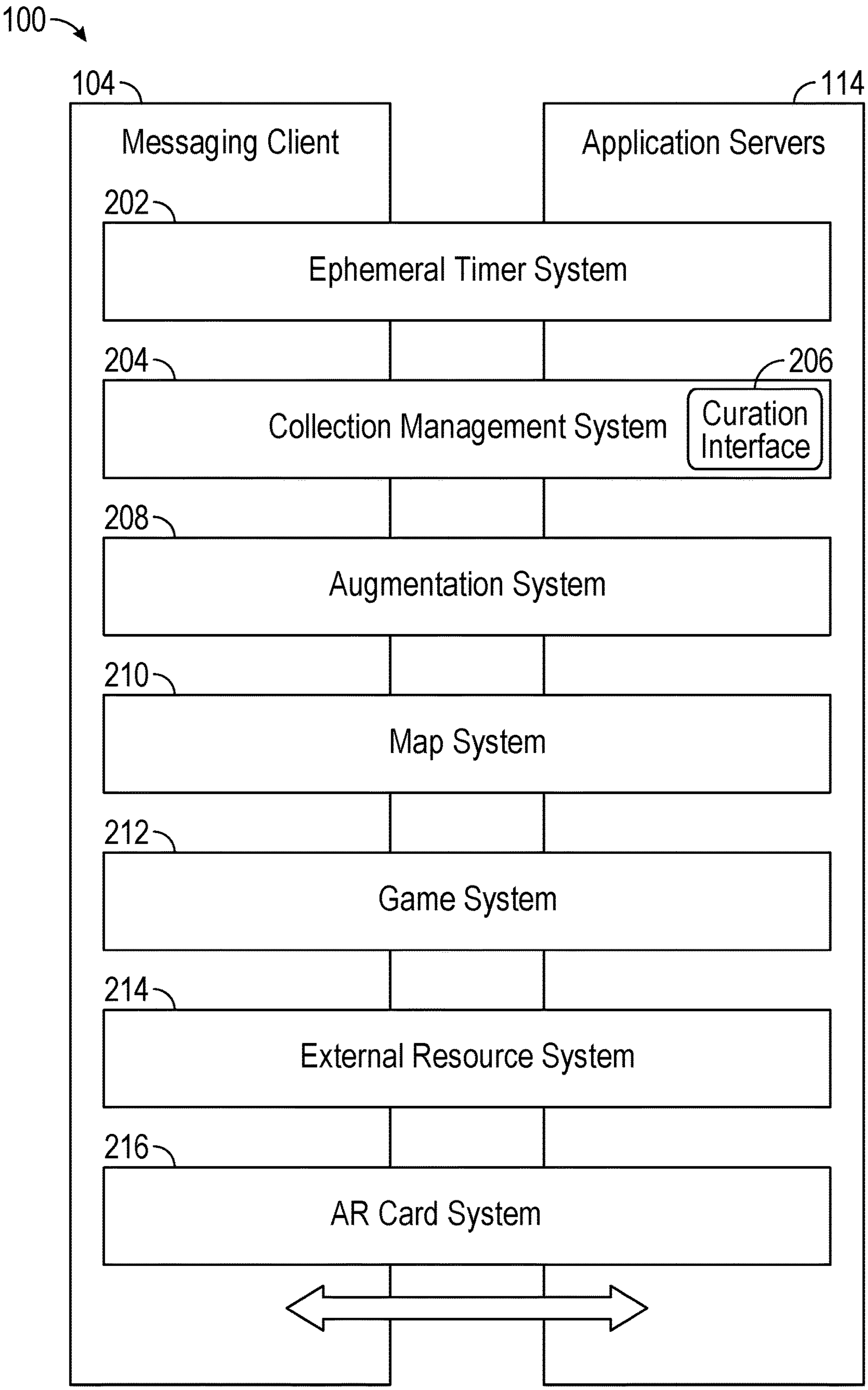
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and an AR card system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object,) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, e.g., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing section of reading materials such as a page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The AR card system 216 supports system 600 for AR card games. The AR card system 216 receives requests from an AR wearable device 602 or user device 102 and responds to the requests. The requests include a request to download a card game 634 and to send messages among AR wearable devices 602 that are playing a card game 634. AR wearable devices 602 may request other services from the AR card system 216 including processing images 648 to identify the location 646 and code 652 of cards 650 within the image 648.

Data Architecture

Figure 3:
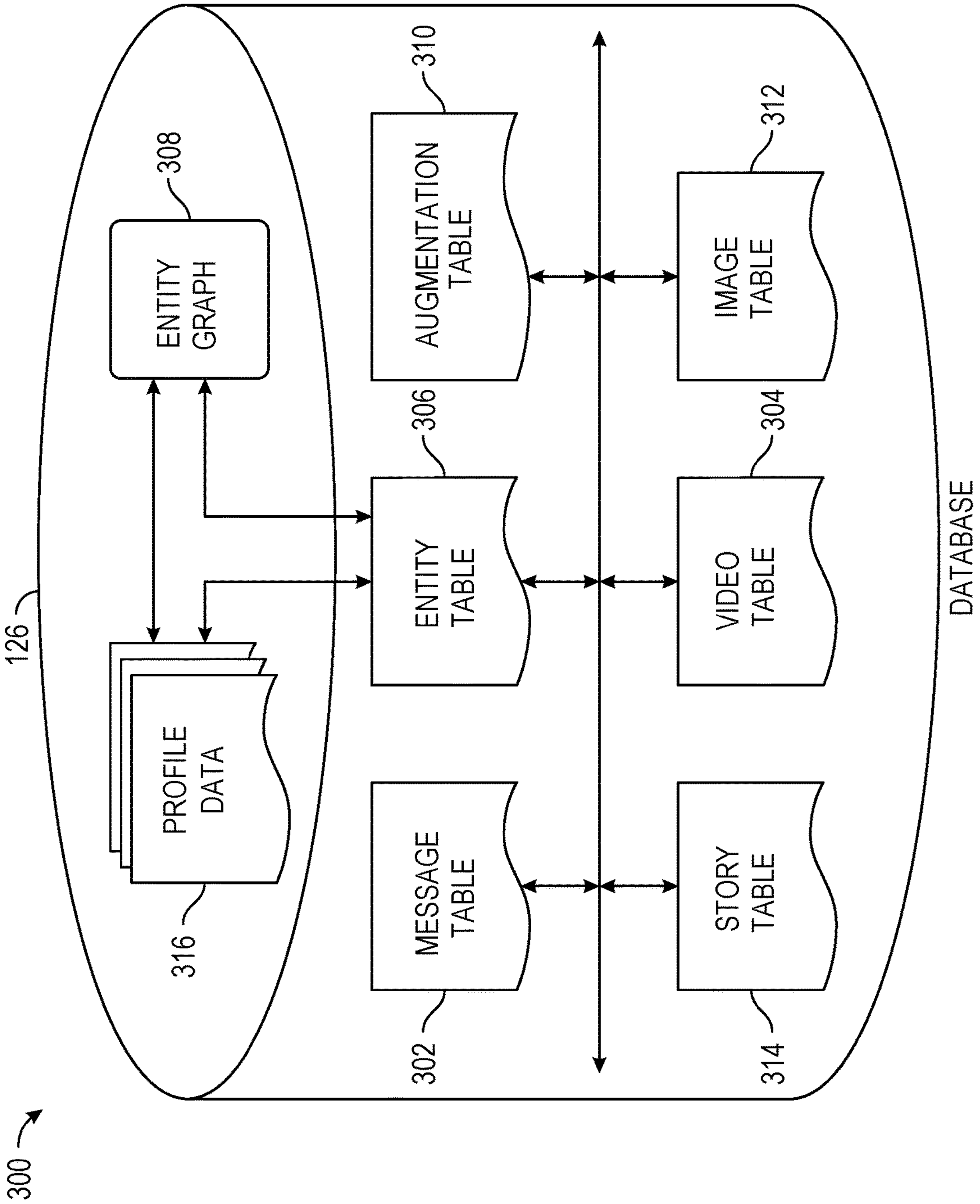
FIG. 3 is a diagrammatic representation of a data structure as maintained in a database, in accordance with some examples.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
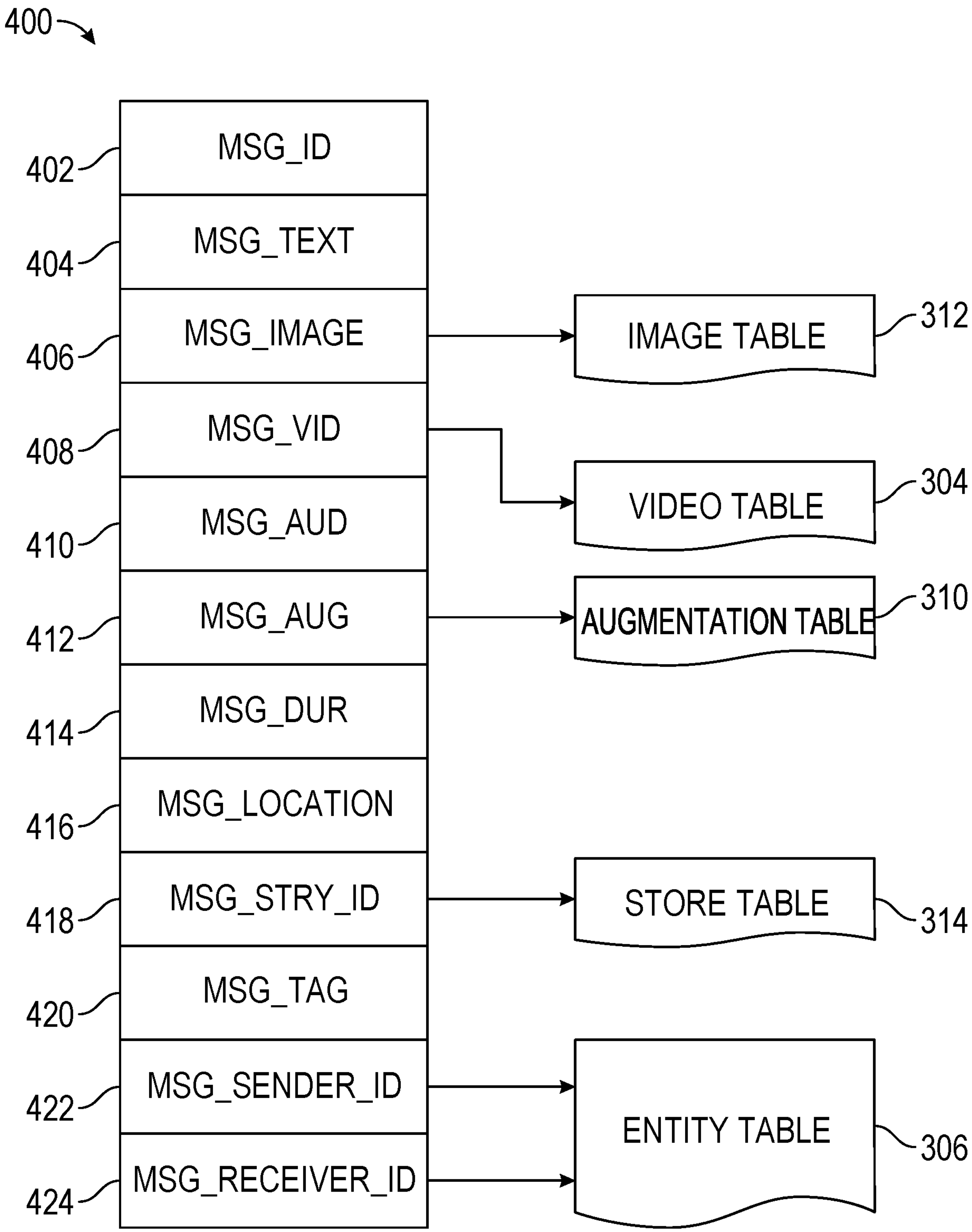
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
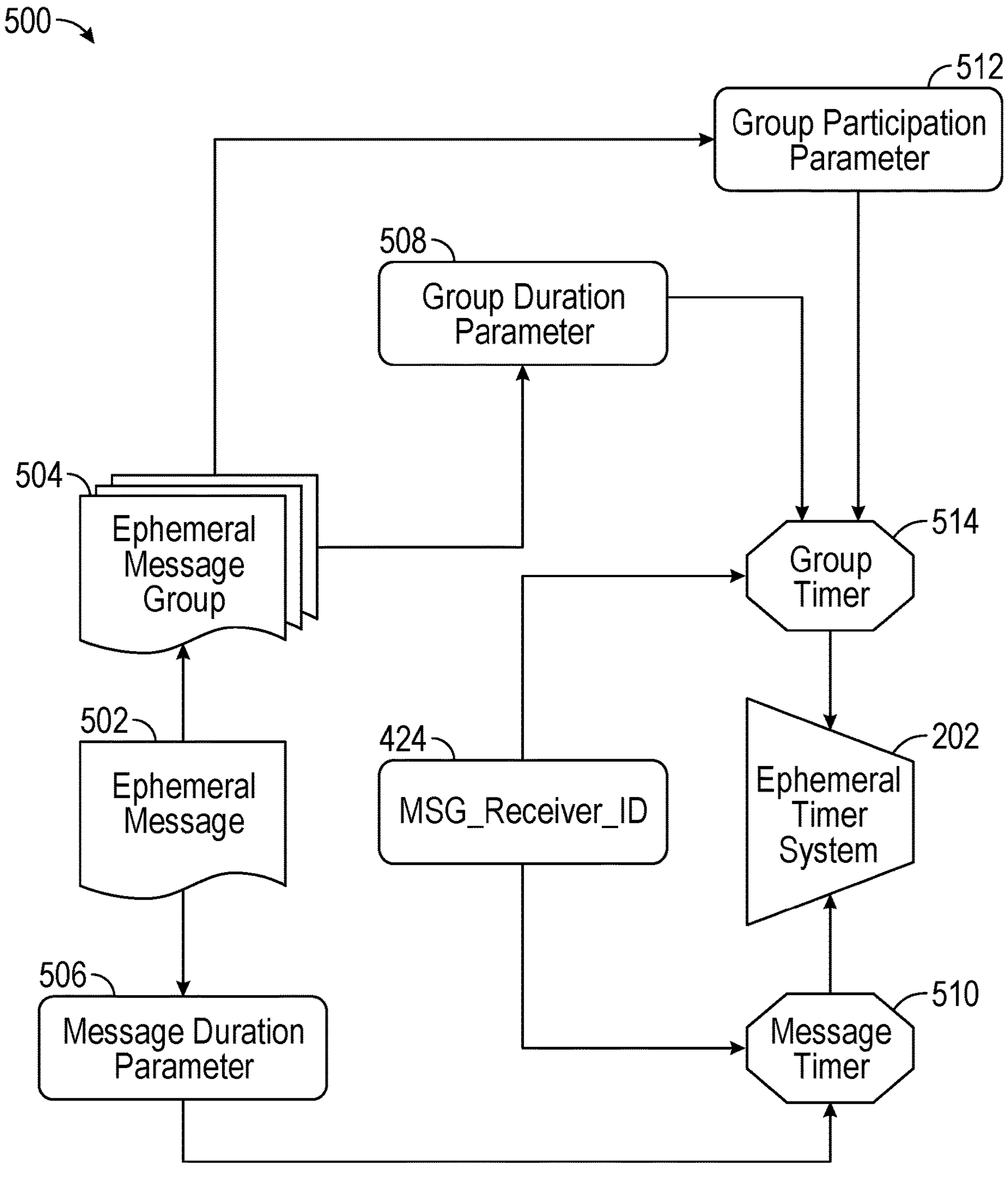
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Augmented Reality Card Games

Figure 6:
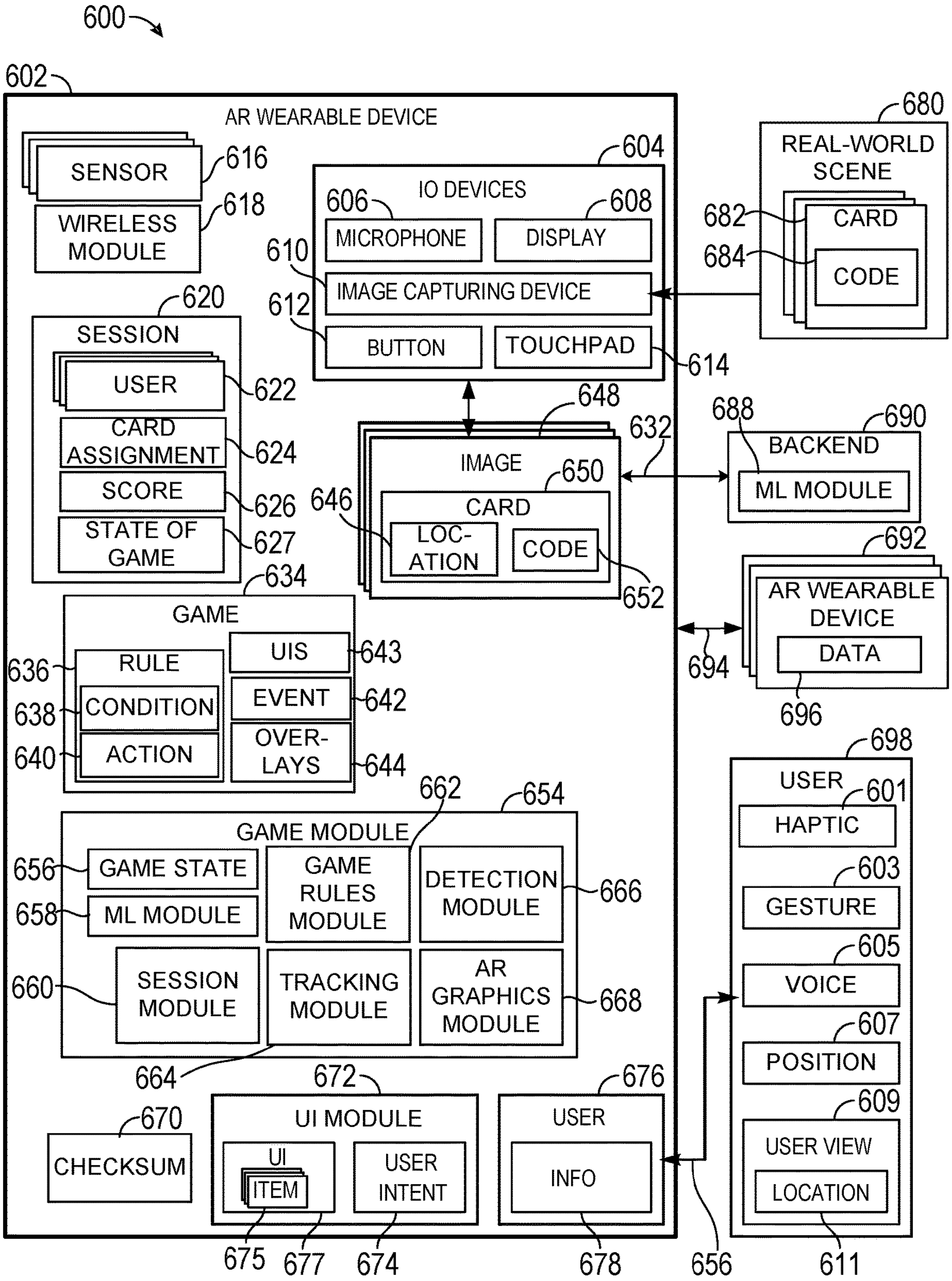
FIG. 6 illustrates a system for augmented reality (AR) card games, in accordance with some examples.

FIG. 6 illustrates a system 600 for augmented reality (AR) card games, in accordance with some examples. The system 600 includes an AR wearable device 602 such as glasses 1200 of FIG. 12. The AR wearable device 602 and AR wearable devices 692 may be mixed reality devices or virtual reality devices. The system 600 includes AR wearable device 602, real-world scene 680, which is what the user 698 sees of the world, backend 690, AR wearable devices 692, which are the AR wearable devices 692 of the other game players, and user 698, which is the user 698 of the AR wearable device 602. The game module 654 enables the user 698 to play a game 634 with other users 622 of the other AR wearable devices 692.

The input/output (IO) devices 604 include devices that enable a user 698 to receive output or provide input to the system 600. The 10 devices 604 include a microphone 606, a display 608, a speaker (not illustrated), an image capturing device 610, a button 612, a touchpad 614, a gyroscope (not illustrated), and so forth. The image capturing device 610 captures the image 648 of the real-world scene 680 which is a front facing view of the user view 609, which is what the user 698 sees through the AR wearable device 602, in accordance with some examples. For example, the user 698 may look through optical elements 1243, 1244 (or lenses) of FIG. 12 to see the user view 609 of the real-world scene 680. The location 611 is a location of the user 698. In some examples, the location 611 is in 3D coordinates within a 3D world coordinate system that indicates a location of the user view 609. The image capturing device 610 may be charged-coupled device (CCD) or another type of device to capture an image of the real-world scene 680. An example of button 612 is button 1278 of FIG. 12. An example of the touchpad 614 is touchpad 1276. The button 612 and touchpad 614 enable the user 698 to provide haptic 601 input. The microphone 606 enables the user 698 to provide voice 605 input. The image capturing device 610 enables the user 698 to provide gesture 603 input via the UI module 672, which processes or analyzes the images 648 to determine the gesture 603 and the user intent 674 based on the analysis of the images 648.

The sensors 616 includes a gyroscope, light sensor, a positioning sensor, a clock, and so forth. An example gyroscope is gyroscopes 1280 of FIG. 12. Some devices such as a gyroscope can be both a sensor 616 and an IO device 604. For example, the user 698 may move the AR wearable device 602, which changes the position 607 of the user 698 and communicates input to the AR wearable device 602. The position 607 of the user 698 is assumed to be the same as the AR wearable device 602, in accordance with some examples. The AR wearable device 602 detects the change in position 607 using a sensor 616 such as a gyroscope or another sensor to detect the change of position 607 of the user 698. The movement of the user 698 may have a user intent 674 to communicate input to the AR wearable device 602. However, the user 698 may move with the AR wearable device 602 without a user intent 674 to communicate input to the AR wearable device 602.

The wireless module 618 communicates 632 between the backend 690 and the AR wearable device 602 and communicates 694 between the AR wearable devices 692 and the AR wearable device 602. The AR wearable devices 692 include data 696, which includes the card assignment 624 and other data and modules. The wireless module 618 is configured to perform wireless communication protocols with the backend 690 and the AR wearable devices 692. The communication protocols may include LE Bluetooth, Institute for Electrical and Electronic Engineers (IEEE) 802.11 communication protocols, proprietary communications protocols, 3GPP communication protocols, and so forth. The wireless module 618 sets up a wireless communication link between the AR wearable device 602 and the backend 690 and between the AR wearable device 602 and AR wearable device 692. For example, the wireless module 618 associates with a corresponding wireless module on the backend 690. The wireless module 618 may communicate with the backend 690 or AR wearable device 692 via another intermediate device such as a user device 102, which may also be the backend 690, an access point, or a node B.

In some examples, the wireless module 618 can be used to determine a location and/or an orientation of the AR wearable device 602 with the assistance of other wireless devices. The other AR wearable devices 692 may be local or close to the AR wearable device 602 and the AR wearable device 602 may communicate via BLE. In some examples, the AR wearable device 692 communicates with the AR wearable devices 692 via a user device 102 such as a paired mobile phone. If an AR wearable device 692 is not local, then the wireless module 618 sets up a communication 694 link between the AR wearable device 602 and the AR wearable device 692. The communication 694 link may be via one or more other devices such as user devices 102, the messaging server system 108, and/or the internet.

The user 676 is data that is related to the user 698. The information (info) 678 includes input data from the user 698 and may include additional information about the user 698 such as a social media account to log onto the messaging server system 108, a username, and so forth.

The game state 656 is stored in a memory of the AR wearable device 602 and indicates a state of the AR wearable device 602 in relation to the game module 654. In some examples, the game state 656 has the following states: "playing", "inactive", "downloading game", and "forming game." Additionally, the user 698 is either a "host" of the game 634 or a "guest" of the game 634. The "inactive" state indicates that the game module 654 is not active. The "downloading game" state indicates that the game module 654 is downloading a game 634. For example, the AR wearable device 602 may download the game 634 from a paired user device 102, which may find or select the game 634 from a website or the messaging server system 108. In some examples, the user 698 may download the game 634 from another AR wearable device 692 or a corresponding user device 102. For example, if the user 698 joins a game session 620 that is "hosted" by another user 622, then the AR wearable device 602 may download the game 634 from another AR wearable device 692 or a corresponding user device 102 of the another AR wearable device 692. In some examples, a game 634 may be purchased and given a license to be run on a number of other AR wearable device 692 for the purpose of playing the game 634 with the user 698. In some examples, the game 634 is configured with two examples where one example is not capable of being the "host".

The "forming game" state of the game state 656 indicates the game module 654 has a game 634 and the user 698 has indicated they would like to play the game 634. For example, the UI module 672 presents a UI 677 that includes an item 675 that when selected by the user 698 indicates a user intent 674 of the user 698 to play the game 634. The user 698 may select whether or not users 622 of a game session 620 are permitted to be remote users 622. The user 698 is presented with UI 677 with an item 675 that admits a user 622 to the session 620 or not. In some examples, a game session 620 may last until it is explicitly ended by the user 698 or a timeout occurs. Once all the user 622 have joined the game session 620, then the game state 656 changes to "playing". The user 622 may have to explicitly start the game 634 or the game 634 may automatically being once enough users 622 have joined the game session 620. The session module 660 manages the formation of the game session 620.

The game module 654 sends a checksum 670 to other AR wearable device 692, and the game module 654 on the other AR wearable device 692 send a checksum 670 to the AR wearable device 602. The game module 654 verifies that checksum 670 is valid for each of the users 622. The checksum 670 may be a different number to verify that the game 634 has not been altered. Additionally, the game module 654 may verify that the other game module 654 have not been verified in another way.

When the game module 654 is in the game state 656 of "playing", the game module 654 is configured as follows. The game module 654 causes or ensures that the image capturing device 610 captures images 648 of the real-world scene 680, which may include cards 682 with codes 684. The detection module 666 uses ML module 688 or ML module 658 to process the image 648 to generate cards 650, codes 652, and locations 646 of the cards 650. The tracking module 664 tracks the movement of the cards 650. The tracking module 664 keeps a data structure to maintain a location of the card 682. The detection module 666 may infer a code 652 for a card 682 when the code 684 is obscured based on the tracking module 664 identifying the card 682 with tracking.

In some examples, the ML module 688, 658 are a neural network trained to identify cards 682 and codes 652 and identify their location 646. For example, the ML module 688 may implement a neural network that has been trained based on training data to detect cards 682 in a real-world scene. The detection module 666 may determine whether to process the images 648 locally or by a backend 690 such as the user device 102.

The term AR graphics includes anything displayed by the AR wearable device 602 on the display 608 for the user 698 to view in conjunction with viewing the real world through lenses. Alternatively, the user 698 may view the real world by the AR wearable device 602 capturing images 648 and displaying the images 648 and the AR graphics on an opaque display 608.

The user 698 lays out the cards 682 that are to be used for the game 634. The game module 654 determines the codes 684 for the cards 650 that are to be used for the game 634. The game module 654 provides an indication to the user 698 that the cards 650 satisfy the requirements of the game 634. The game module 654 of the "host" of the game 634 determines a card assignment 624 between the overlays 644 and the codes 684. The "host" session module 660 sends the card assignment 624 to the "guest" AR wearable devices 692.

The AR graphics module 668 determines the overlay 644 for the card 650 based on the code 652 and the card assignment 624. The AR graphics module 668 processes the location 646 of the card 650 and the determined overlay 644 and displays the overlay 644 on the display 608 for the user 698 to view in conjunction with viewing the user view 609 of the real-world scene 680. The user 698 sees the card 682 with the overlay 644 on top of the card 682. In some examples, there is a default overlay 644 for cards 682 where the code 684 was not captured or could not be determined by the detection module 666. For example, a user 698 may be holding five cards 682 and the detection module 666 can detect or determine with the help of the tracking module 666 the code 684 for those five cards 682, but the detection module 666 cannot detect the code 684 of the cards 682 the other users 622 are holding. The cards 682 the other users 622 are holding may not have the code 684 visible. The AR graphics module 668 may use a default overlay 644 to display for these cards 682. For example, the default overlay 644 may be an image of the back of a standard card 682. In some examples, the cards 682 can be blank and only have a code 684 such as a QR code. The user 698 and users 622 can then not discern the value or identity of the card 682 without the card assignment 624. Additionally, if the user 698 and users 622 do not expose the codes 684 of their cards 682, then the user 698 and users 622 could not discern the value or identity of the other players cards 682 even with the card assignment 624. In some embodiments, the cards 682 include both codes 684 and identities so that the cards 682 could be used either without the game module 654 where the identities like Ace, two, three, and so forth, or with the codes 684 where the game module 654 identifies the codes 652 and uses AR to display the overlays 644 on the cards 682.

In some examples, the AR graphics module 668 projects or adjusts the overlays 644 to be in a proper perspective for the location 646 of the card 650 and based on the location 611 of the user view 609. For example, the AR graphics module 668 adjusts the size and angle of an overlay 644 to fit on a card 682 in accordance with the location 646 of the card 650 and the location 611 of the user view 609 of the real-world scene 680.

In some examples, the overlays 644 are videos or animations, so the AR graphics module 668 changes the overlay 644 for the card 682 at a suitable rate for a video or animation. If a user 622 is a remote user 622, then the "host" game module 654 sends card 682 and code 684 information to the corresponding AR wearable device 692 of the remote user 622. In some examples, there is one set of cards 682 that are used and remote users 622 are sent information about the cards 682 and codes 684 of all users 622 so that the AR wearable device 692 of the remote user 622 can display the game 634 properly. For example, the session module 660 sends the remote AR wearable device 692 card 650, location 646, and code 652 information that is processed by the detection module 666 of the "host" AR wearable device 602. Additionally, since the code 684 does not reveal a value of the card 682 without the card assignment 624 being known by a user 698 viewing the code 684, the cards 682 of a remote user 622 may be played face up.

The tracking module 664 tracks the movement of the cards 650. And provides updates to the AR graphics module 668 so it can adjust the display of the overlays 644 on the display 608. Often, the intention is to have the overlays 644 cover a surface of the card 650. In some examples, the tracking module 664 uses motion sensors 616 to determine a change in location 611 of the user view 609. The user 698 may, for example, move their head. The AR graphics module 668 can move the overlays 644 a number of pixels based on the change in the location 611, in accordance with some examples.

Figure 11:
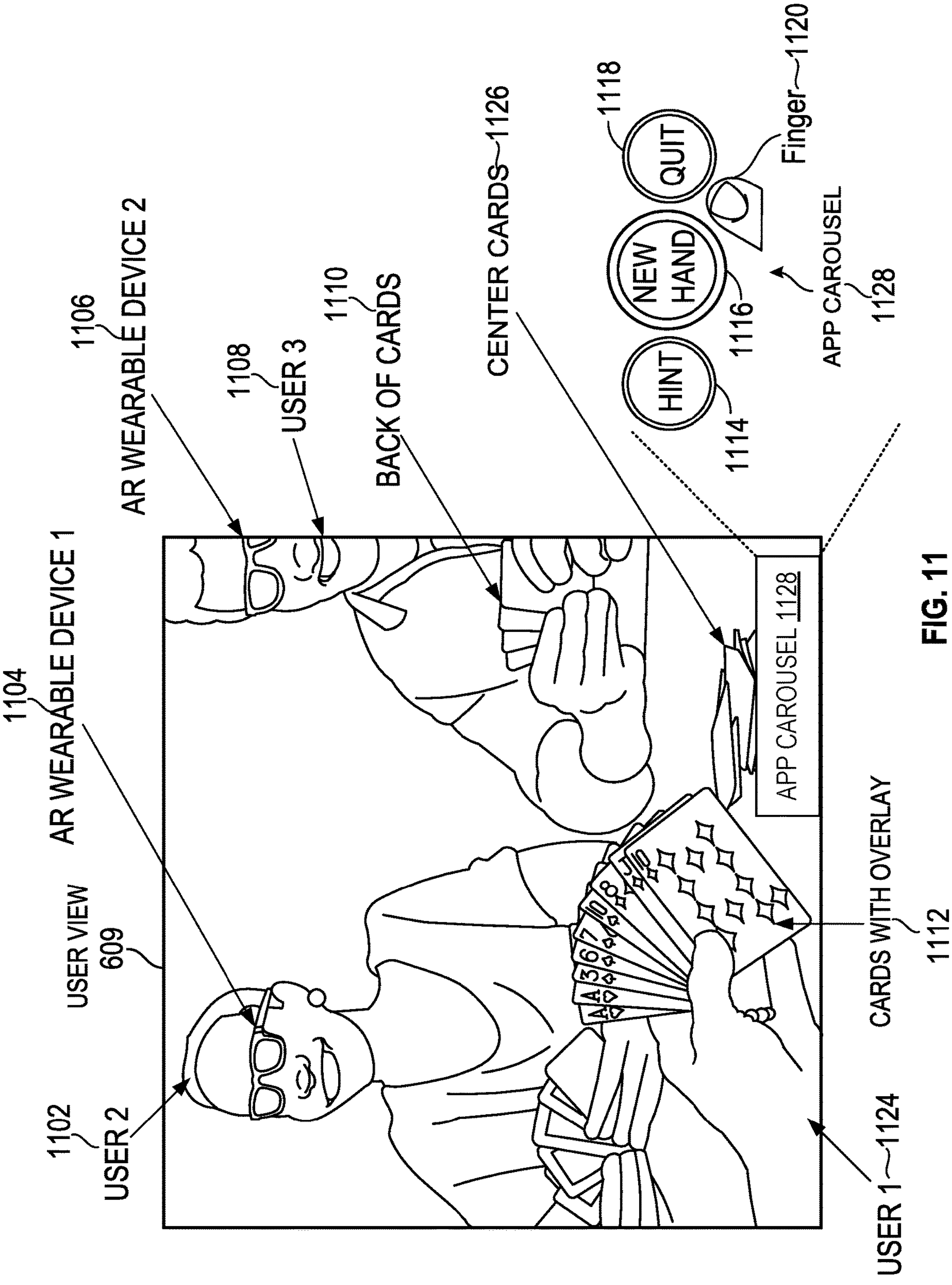
FIG. 11 illustrates users playing an AR card game, in accordance with some examples.

The UIs 643 are UI 677 that may be presented to the user 698. For example, the app carousel 1128 of FIG. 11 is a UI 677 that is presented to user 1 1124. The UIs 643 may indicate that they can be shared among the user 698 and the users 622. The AR wearable device 602 and AR wearable device 692 may determine a location to virtually locate the UI 677 such as on a tabletop, and then the user 698 and the users 622 will all perceive a single UI 677 that appears to the user 698 and users 622 as if it is being shared. In some embodiments, a 3D world model is generated by the AR wearable device 602. The AR wearable device 602 shares with the AR wearable device 692 information regarding the 3D world model that enables the AR wearable device 692 and the AR wearable devices 692 to coordinate the placing of the UI 677 at a shared location such as on the tabletop.

In some examples, the game 634 is a code that interacts with the game module 654 and the AR wearable device 602 using application program interfaces (API). For example, there is an API for the game 634 to display one of the UIs 643 on the display 608 and another API to determine the user 698 input from the UI module 672.

In some examples, the game rules module 662 determines if an event 642 has occurred, and if an event has occurred, then the games rules module 652 determines if a condition 638 of a rule 636 associated with the event 642 applies. More than one rule 636 may be associated with an event 642. If the condition 638 applies, then the action 640 is performed.

For example, the UI module 672 determines that the user 698 performed the event 642 of "playing a card". The UI module 672 determines this based on one or more of the following: the code 652 of the card 650 becoming visible to other users 622, a change in location 646 of the card 650, and/or a movement of the hand of the user 698. In some examples, the game module 654 includes information that is used by the UI module 672 to detect events 642. In some examples, the games rules module 662 detects the events 642.

The games rules module 662 determines which rules 636 are associated with the event 642 and then determines whether a condition 638 of a rule 636 associated with the event 642 is true. If the condition 638 is true, then the games rules module 662 performs the action 640. The action 640 may be pseudo-code that the games rules module 662 performs. Continuing with the example above, if the UI module 672 determined that user 698 had performed the event 642 of "playing a card", then the games rules module 662 determines the rules 636 associated with the event 642. An example rule 636 for "Go Fish" includes a condition 638 of: "if the card played is a valid card played and the card is a last card of the user 698, then the game is over and the user 698 won."

The games rules module 662 determines if the condition 638 is satisfied. If the condition 638 is satisfied or met, then the associated action 640 is performed by the game rules module 662. Continuing the example above, the action 640 is "display the user has won." Another example rule 636 for "Poker" includes a condition 638 of: "if a user won the hand". And an action 640 of "adjusting a score in accordance with the user that won." Another example rule 636 for "Poker" includes a condition 638 of: "if a card is incorrectly played". With an action 640 of "displaying an indication that the card is being incorrectly played."

Some rules 636 may not be able to be performed by the "host" AR wearable device 602. For example, in the game of "Hearts" a player may not play a card 682 with the suit of "hearts" unless the player does not have a card 682 of the same suit that was played first to start the trick or hand. In this case, the games rules module 662 would only be able to apply the rule 636 if the games rule module 662 knew which cards 682 the player who played the "heart" had. In some examples, the action 640 may include changing an overlay 644 for a card 682. For example, a user 698 may have a rank or status indicated by the overlay 644. The action 640 may indicate to select the appropriate overlay 644 for a card 682 based on the status of the user 698, the state of game 627, the score 626, or some other parameter associated with the game 634.

The games module 654 and/or the game 634 maintain a state of game 627. The state of game 627 indicates information such as the cards 682 that have been played, which cards 682 are in the stack, which cards are laying on the table, and so forth. The state of game 627 is dependent on the game 634 and the rules 636.

In some examples, the rules 636 are applied by all the game rules modules 662 of the AR wearable devices 602, 692. The game module 662 may share information such as which event 642 triggered a rule 636 and what action 640 was taken. In some examples, the rules 636 are applied by all the game rules modules 662 of the AR wearable devices 602, 692. In some examples, the rules 636 are applied by only the game rules module 662 of the "host" AR wearable devices 602.

In some examples, the game module 654 may be one of the users 622 to play with the user 698. The game module 654 indicates to the user 698 the card 682 or cards 682 to physically move and where to move them. In some examples, the AR wearable device 602 does not include information regarding the codes 652 of cards 682. The user 698 and users 622 may deal the cards to conceal the codes 684 so that only the user 698 that is dealt the card 682 can see the code 684. In this way, the user 698 can be certain that the other users 622 are not cheating. The only information that needs to be shared is the card assignment 624.

Figure 7:
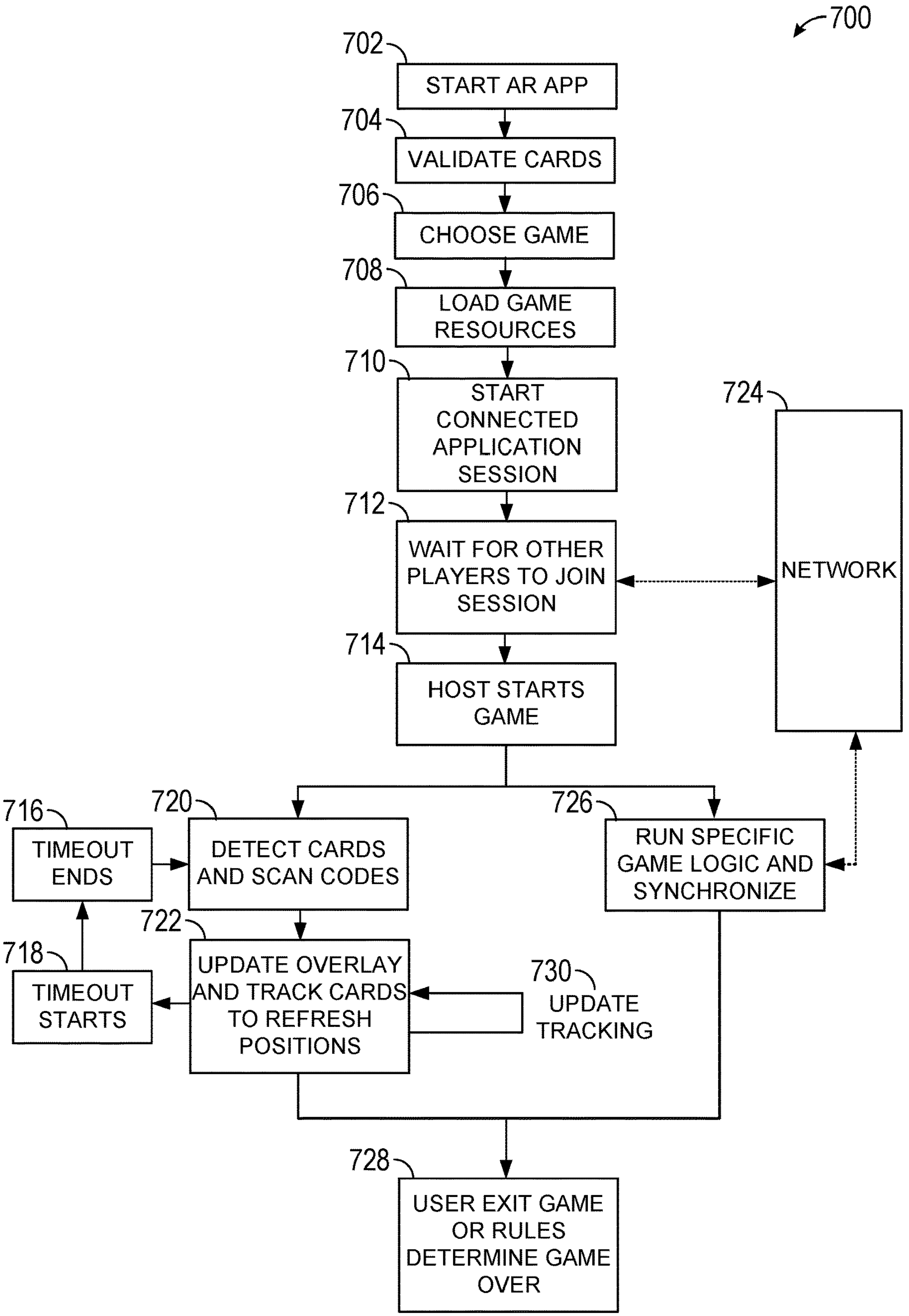
FIG. 7 illustrates a method for AR card games, in accordance with some examples.

FIG. 7 illustrates a method 700 for AR card games, in accordance with some examples. The method 700 may be performed by an apparatus of an AR wearable device 602 such as glasses 1200 of FIG. 12, or another apparatus or device. The method 700 begins at operation 702 with starting AR application. For example, the game module 654 is started in the AR wearable device 602. In some examples, the user device 102 downloads the game module 654 to the AR wearable device 602 with an indication to run the game module 654. The method 700 continues at operation 704 with validating the cards. For example, the detection module 666 validates that the cards 682 are a proper number of cards and have different codes 684 that can be identified. The method 700 continues at operation 706 with choosing game. For example, the user 698 of the AR wearable device 602 selects the game 634 to play or enters a remote game session 620 to play a game that is hosted by another AR wearable device 692.

The method 700 continues at operation 708 with loading game resources. For example, the game module 654 loads the game 634 from a backend 690. The method 700 continues at operation 710 with starting connected application session. For example, the session module 660 starts the session 620, which enables other users 622 of other "guest" AR wearable devices 692 to join the session 620. The method 700 continues at operation 712 with waiting for other players to join the session. For example, the session module 660 may wait for additional other users 622.

The method 700 continues at operation 714 with host starting the game. For example, once a sufficient number of users 622 have joined the session 620, the "host" session module 660 either starts the game or prompts the user 698 to determine whether the user 698 would like to start the game with the current number of users 622 or wait for more users 622. The "guest" AR wearable devices 692 of the users 622 communicate with the "host" AR wearable device 602 via a network 724. In some examples, the session module 660 discovers which other AR wearable device 692 are present and sends them messages inviting them to join the session 620.

The method 700 continues at operation 720 with detecting and scanning codes. For example, detection module 666 of the "host" AR wearable device 602 and the "guest" AR wearable devices 692 process images 648 to determine the cards 682 and the codes 684. The method 700 continues at operation 722 with updating overlays and tracking cards to refresh positions. For example, the "host" game module 654 generates a card assignment 624 mapping the codes 684 to the overlays 644. The AR graphics module 668 displays on the display 608 of the AR wearable device 602 the overlays 644 over the cards 682. The tracking module 664 tracks the movement of the cards 682 and provides updated location information to the AR graphics module 668 to update the display of the overlays 644. The method 700 continues at operation 730 with updating tracking. For example, the tracking module 664 continues to track the location 611 of the user view 609 and the location 646 of the cards 682 and provides this information to the AR graphics module 668. The AR graphics module 668 updates the location on the display 608 of the overlays 644 based on this information.

The method 700 continues with a timeout starts 718. For example, a timeout may start when the tracking module 664 is tracking the cards 682. If the tracking module 664 cannot determine the movement of the cards 682 or if there appears to be no movement of the cards 682, then a timeout ends at operation 716, and the method 700 refreshes the locations 646 and codes 652 of the cards 682.

The method 700 continues at operation 726 with running specific game logic and synchronizing via the network 724. For example, the games rules module 662 determines if events 642 occurred and if an event 642 occurs, then the games rules module 662 determines which rules 636 are associated with the event 642. The games rules module 662 then applies the rules 636 that are associated with the event 642. The games rules module 662 and UI module 672 determine if an event occurred based on input from the user 698 and/or based on changes to the location 646 of the one or more cards 682. The session module 660 synchronizes any information that is to be shared among the "host" AR wearable device 602 and the "guest" AR wearable devices 692 via the wireless module 618.

The method 700 continues at operation 728 with the user exiting the game or the rules determining that the game is over. For example, the user 698 may provide input to the UI module 672 that indicates a user intent 674 to end the game 634. In another example, the games rules module 662 determines the game 634 is over based on a rule 636. In another example, the session module 660 receives an indication that the game is over based on another user 622 quitting the game, a lost session 620, or the game ending based on a rule 636. A rule 636 may be triggered by an event 642 of a user 622 or a user 698 quitting the game. The rule 636 will determine whether the game 634 should end, the game 634 should continue, or one or more users 622, 698 should be queried if they want to continue to play the game 634.

The method 700 may include one or more additional operations. Operations of method 700 may be performed in a different order. One or more of the operations of method 700 may be optional. The method 700 may be performed by the client device 102, system 600, glasses 1200, or another electronic device. Portions of the functionality may be performed on a server computer or host computer. For example, glasses 1200 may be coupled to a host client device 102 or application server 114 where one or more of the operations are performed.

Figure 8:
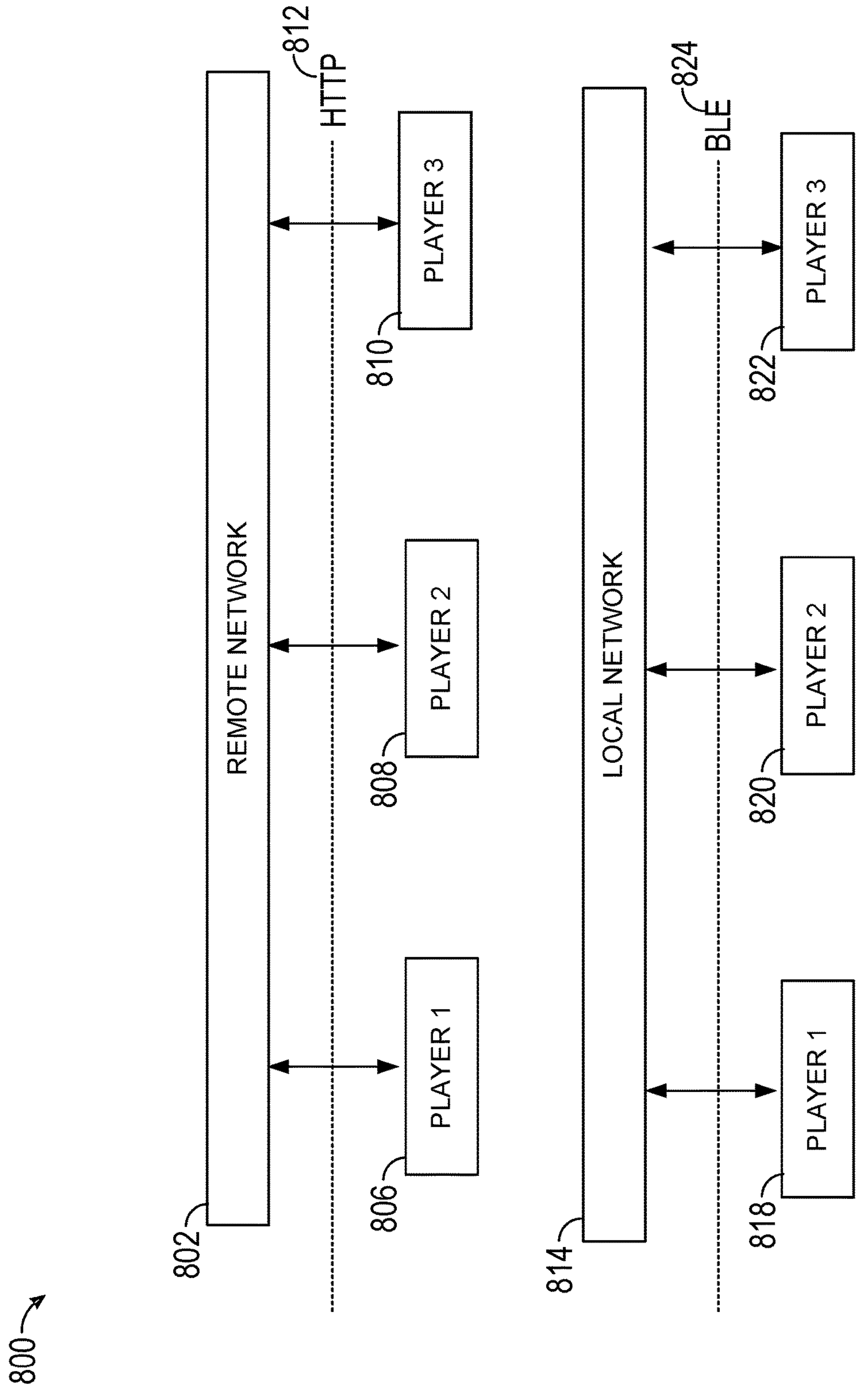
FIG. 8 illustrates communications for AR card games, in accordance with some examples.

FIG. 8 illustrates communications 800 for AR card games, in accordance with some examples. A remote network 802 such as the internet, 3GPP, and so forth is used to send HTTP 812 messages among player 1 806, player 808, and player 3 810. Player 1 806, play 2 808, and player 3 810 are AR wearable devices 602, in accordance with some examples. In some examples, Player 1 806, player 2 808, and player 3 810 are user devices 102 that then relay the messages to AR wearable devices 602 using another communication protocol such as BLE. Player 1 806, player 2 808, and player 3 810 are "remote" players in the context of the game module 662 so that more information has to be shared among the players such as changes in the location 646 of cards 682 and the activation of rules 636. During "remote" play an audio channel is established to share audio data among player 1 806, play 2 808, and player 3 810.

The local network 814 uses a wireless protocol such as BLE 824 to connect player 1 818, player 2 820, and player 3 822 locally. For example, the players may all be at the same table sharing the same cards 682. Player 1 818, player 2 820, and player 3 822 are AR wearable devices 602, in accordance with some examples. In some examples, Player 1 818, player 2 820, and player 3 822 are user devices 102 that then relay the messages to AR wearable devices 602 using a communication protocol such as BLE. In some examples, some of the players may be using a remote network 802 to communicate and some of the players maybe using the local network 814 to communicate. The wireless module 618 of FIG. 6 is configured to communicate both over the remote network 802 and over the local network 814. Additionally, the wireless module 618 may relay communications via one or more other devices such as the backend 690, an access point, an eNodeB, or the internet.

Figure 9:
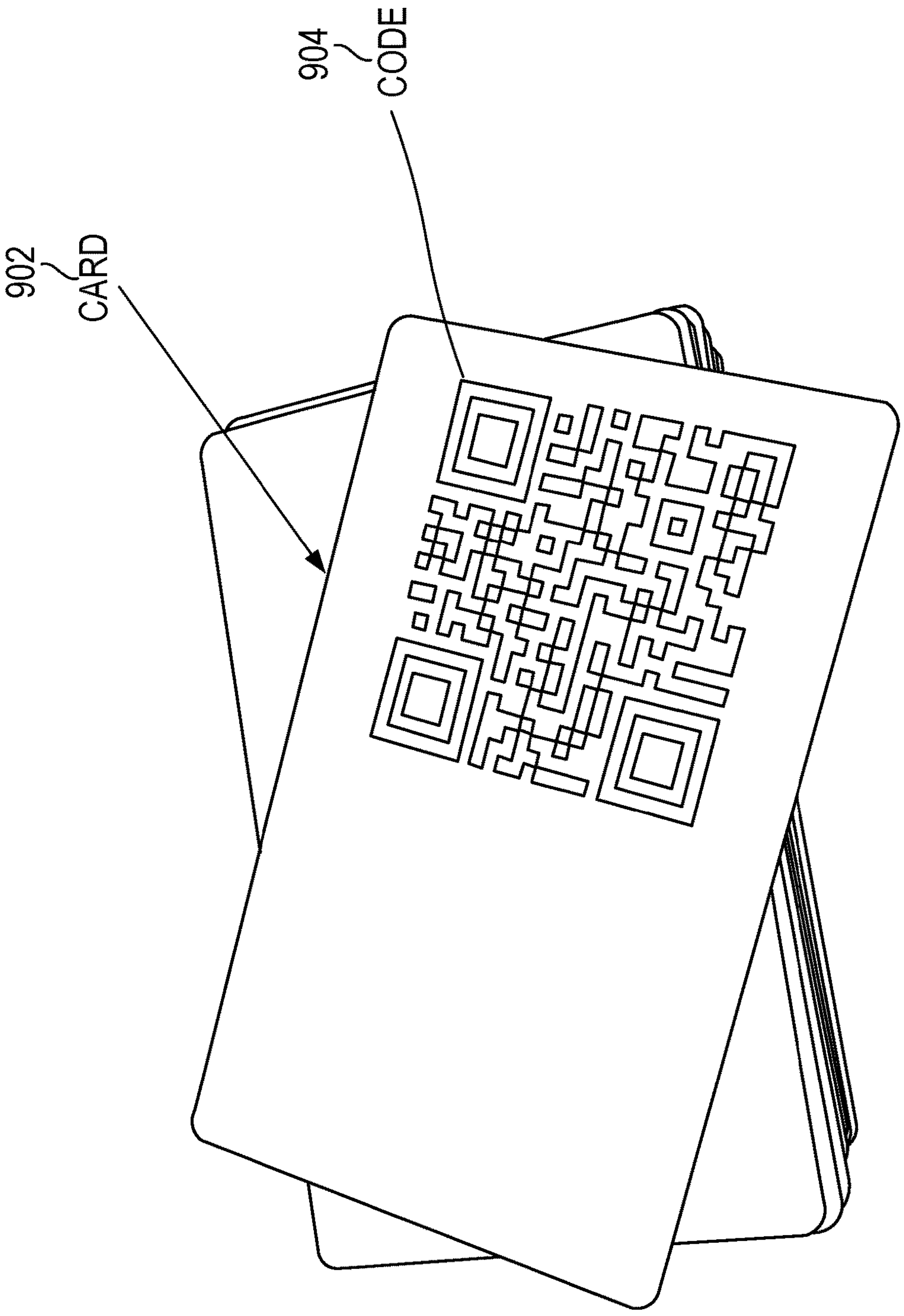
FIG. 9 illustrates a physical card, in accordance with some examples, in accordance with some examples.

FIG. 9 illustrates a physical card 902, in accordance with some examples. The card 902 may be an ordinary card made of paper, plastic, or another substance. The card 902 may have different thicknesses. The card 902 may have the dimensions of an ordinary playing card or other dimensions. For example, the card 902 may have eight sides and may not be symmetric. The card 902 may be other shapes such as a 3D shape of a die or another 3D shape. The code 904 is used by the game module 654 to identify the card 902 so each code 904 must provide enough information to uniquely identify the card 902 among a group of cards 902. The code 904 is bar code or quick response code in accordance with some examples. In some examples, the code 904 provides information to retrieve a game 634 from the internet. For example, a user 698 may purchase a deck of cards 902 where each card 902 has a different code 904 that may be used to retrieve a game 634 from the internet where the games 634 may be different. In some examples, the code 904 is on the edge of the card 902 so that the code 904 may be more easily identified. The code 904 may be repeated and may be on any side of the card. The code 904 does not provide the user 698 of FIG. 6 with information regarding the overlay 644 of the card 902 without the card assignment 624, which is kept secret.

Figure 10B:
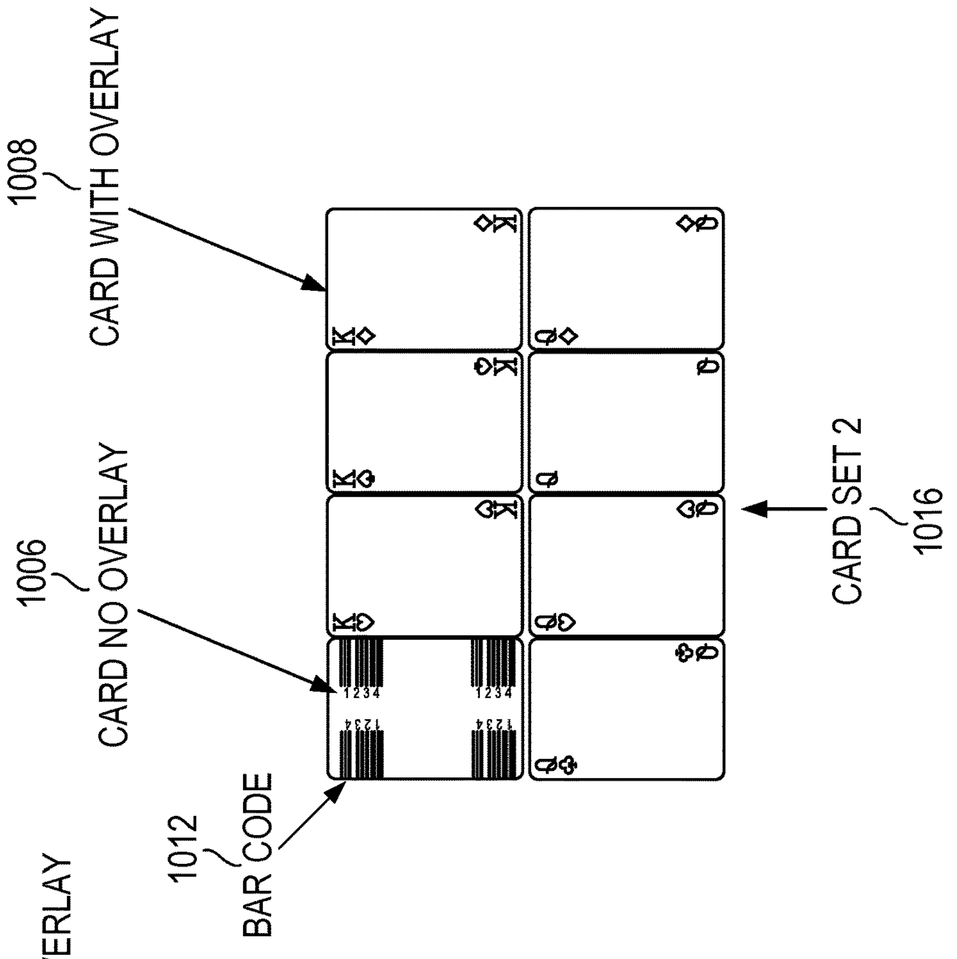
FIGS. 10A and 10B illustrate card sets, in accordance with some examples.
Figure 10A:
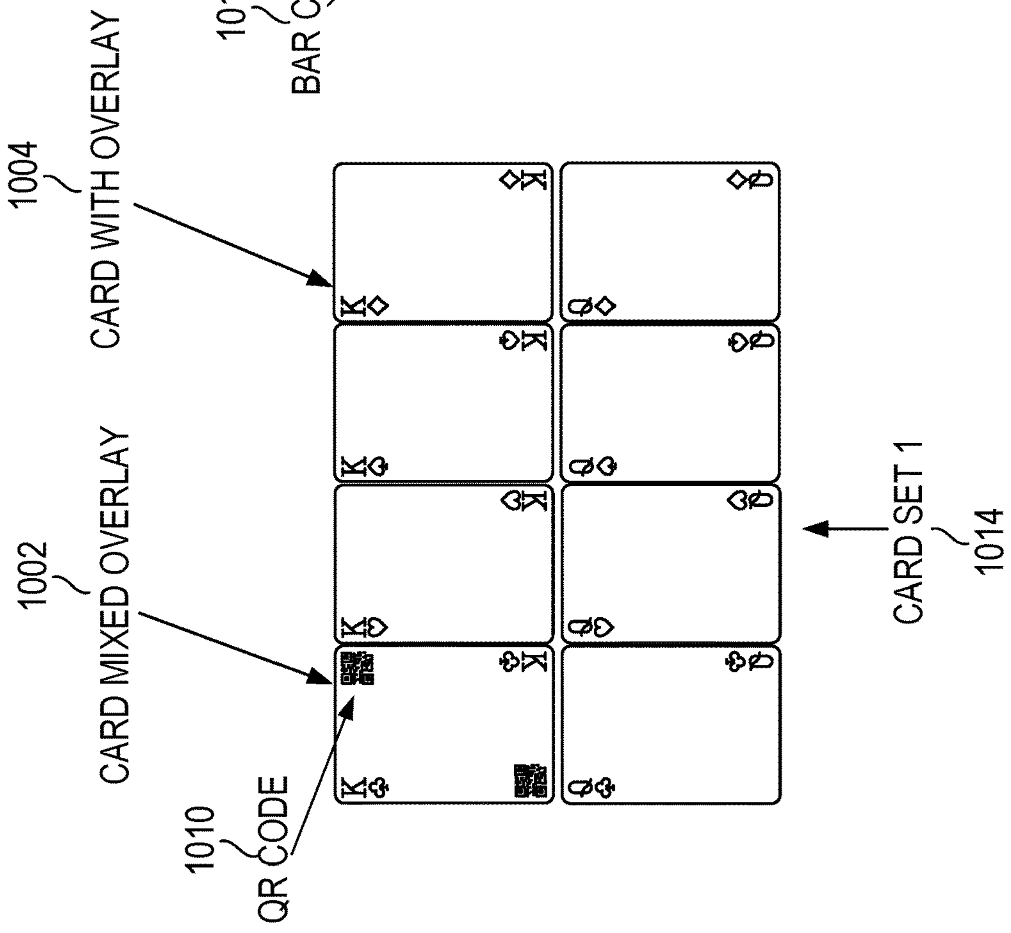

FIGS. 10A and 10B illustrate card sets, in accordance with some examples. Card set 1 1014 has QR codes 1010 to identify the cards. The game module 654 identifies the cards based on the QR code 1010 and then matches the QR code 1010 to an overlay 644 as described in conjunction with FIG. 6. The card set 1 1014 is illustrated as they would appear being displayed on the display 608. The card mixed overlay 1002 illustrates a card with an overlay 644 where the QR code 1010 remains visible. The overlay 644 for the card mixed overlay 1002 may not include the two corners where the QR code 1010 remains visible. The card with overlay 1004 indicates that the card has been identified by a QR code 1010 and an overlay 644 is being displayed on the display 608 so that the QR code 1010 is not visible. Card set 2 1016 has bar codes 1012 to identify the cards. The bar code 1012 is used to identify the card and match the card with an overlay 644. The card no overlay 1006 indicates that the card is being viewed without an overlay 644. Card with overlay 1008 indicates the cards are being illustrated as they would appear being displayed on the display 608 of the AR wearable device 602 with their respective overlays 644.

FIG. 11 illustrates users playing an AR card game, in accordance with some examples. The illustration is of the user view 609. The user view 609 is what user 1 1124 sees through their AR wearable devices 602 (not illustrated). Only the hand of user 1 1124 is visible. User 1 1112 is holding cards with overlay 1112 where the physical cards are similar to physical card 902 of FIG. 9. The AR graphics module 668 is displaying the overlays 644 on the cards with overlay 1112. Additionally, the user view 609 includes a view of the cards of user 2 1102. The cards of user 2 1102 and user 3 1108 may or may not have overlays 644. The cards may have the appearance as illustrated or the AR graphics module 668 may be displaying overlays 644 on the display 608 of user 1 1124 for the physical cards. User 2 1102 is wearing AR wearable device 1 1104. User 3 1108 is wearing AR wearable device 2 1106. The center cards 1126 are physical cards. AR wearable device 1 1104, AR wearable device 2 1106, and the AR wearable device 602 of user 1 1124 all share a common card assignment 624, so all the users see the center cards 1126 the same way, in accordance with some examples. User 1 1124 sees the back of cards

1110 of user 3 1108. The AR graphics module 668 may be displaying overlays 644 on the physical cards of the back of cards 1110.

The UI module provides a UI 677 of an application (APP) carousel 1128. The finger 1120 of user 1 1124 is displayed. The user 1 1124 may see their actual finger 1120 through a lens of the AR wearable device 602. The app carousel 1128 provides items 675 of “Hint” 1114, “New Hand” 1116, and “quit” 1118. The user 1 1124 selects an item 675 by placing their finger 1120 in over the location where the item 675 is displayed. The app carousel 1128 may be defined by the UIs 643 of the game 634. For example, app carousel 1128 may be defined or indicated by the UIs 643. In some examples, the UIs 643 may be indicated as shared or common UIs 643. For example, the app carousel 1128 may be displayed on the displays 608 of the different AR wearable devices 602 to appear on the tabletop in a same location for user 1 1124, user 2 1102, and user 3 1108, so that they appear to share the app carousel 1128.

Figure 12:
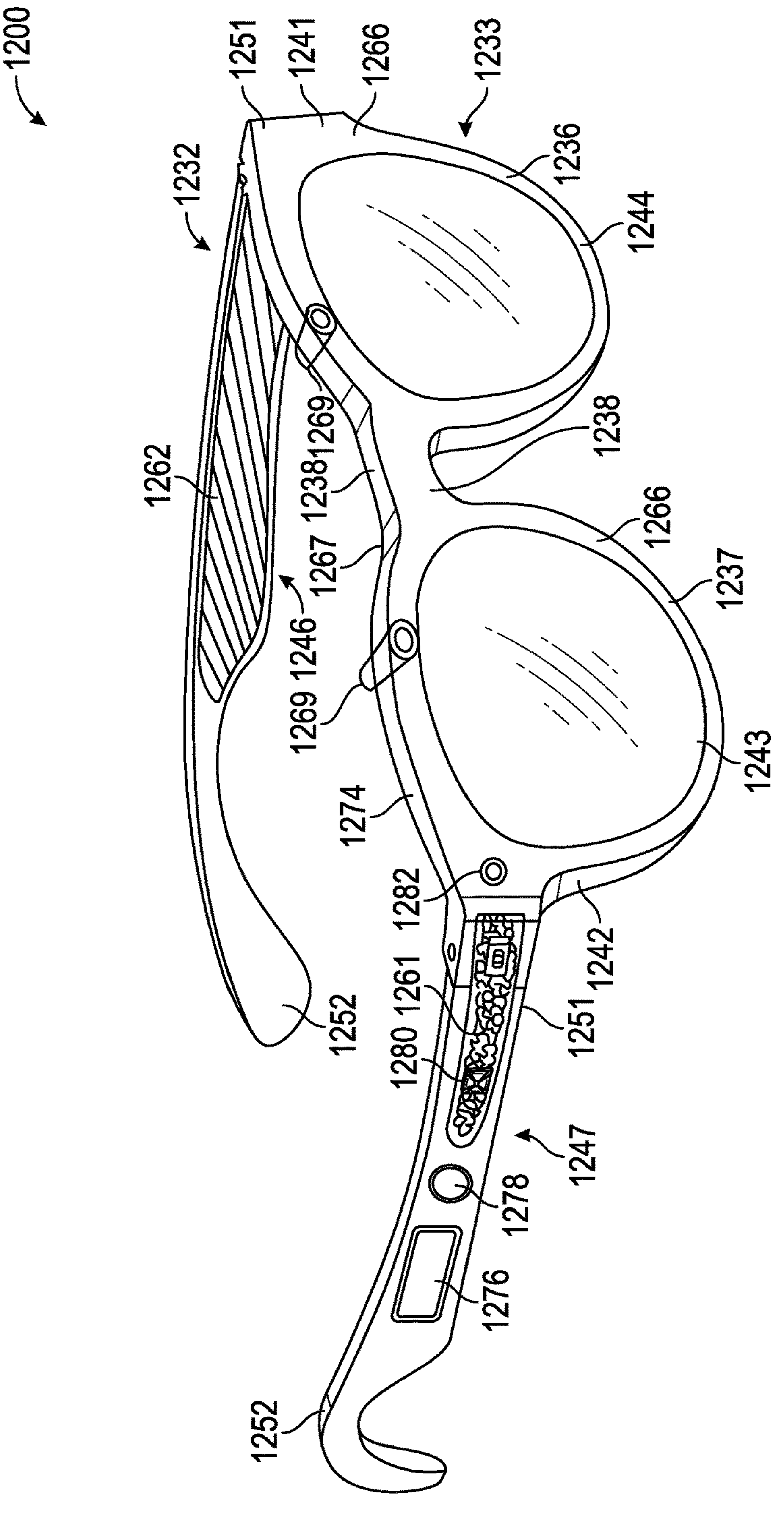
FIG. 12 is a perspective view of a wearable electronic device in the form of glasses, in accordance with some examples.

FIG. 12 is a perspective view of a wearable electronic device in the form of glasses 1200, in accordance with some examples. The glasses 1200 are an article of eyewear including electronics, which operate within a network system for communicating image and video content. In some examples, the wearable electronic device is termed AR glasses. The glasses 1200 can include a frame 1232 made from any suitable material such as plastic or metal, including any suitable shape memory alloy. The frame 1232 can have a front piece 1233 that can include a first or left lens, display, or optical element holder 1236 and a second or right lens, display, or optical element holder 1237 connected by a bridge 1238. The front piece 1233 additionally includes a left end portion 1241 and a right end portion 1242. A first or left optical element 1244 and a second or right optical element 1243 can be provided within respective left and right optical element holders 1236, 1237. Each of the optical elements 1243, 1244 can be a lens, a display, a display assembly, or a combination of the foregoing. In some examples, for example, the glasses 1200 are provided with an integrated near-eye display mechanism that enables, for example, display to the user of preview images for visual media captured by cameras 1269 of the glasses 1200.

The frame 1232 additionally includes a left arm or temple piece 1246 and a right arm or temple piece 1247 coupled to the respective left and right end portions 1241, 1242 of the front piece 1233 by any suitable means such as a hinge (not shown), so as to be coupled to the front piece 1233, or rigidly or fixedly secured to the front piece 1233 so as to be integral with the front piece 1233. Each of the temple pieces 1246 and 1247 can include a first portion 1251 that is coupled to the respective end portion 1241 or 1242 of the front piece 1233 and any suitable second portion 1252, such as a curved or arcuate piece, for coupling to the ear of the user. In one example, the front piece 1233 can be formed from a single piece of material, so as to have a unitary or integral construction. In one example, the entire frame 1232 can be formed from a single piece of material so as to have a unitary or integral construction.

The glasses 1200 include a computing device, such as a computer 1261, which can be of any suitable type so as to be carried by the frame 1232 and, in one example, of a suitable size and shape, so as to be at least partially disposed in one or more of the temple pieces 1246 and 1247. In one example, the computer 1261 has a size and shape similar to the size and shape of one of the temple pieces 1246, 1247 and is thus disposed almost entirely if not entirely within the structure and confines of such temple pieces 1246 and 1247.

In one example, the computer 1261 can be disposed in both of the temple pieces 1246, 1247. The computer 1261 can include one or more processors with memory, wireless communication circuitry, and a power source. The computer 1261 comprises low-power circuitry, high-speed circuitry, location circuitry, and a display processor. Various other examples may include these elements in different configurations or integrated together in different ways. Additional details of aspects of the computer 1261 may be implemented as described with reference to the description that follows.

The computer 1261 additionally includes a battery 1262 or other suitable portable power supply. In one example, the battery 1262 is disposed in one of the temple pieces 1246 or 1247. In the glasses 1200 shown in FIG. 12, the battery 1262 is shown as being disposed in the left temple piece 1246 and electrically coupled using a connection 1274 to the remainder of the computer 1261 disposed in the right temple piece 1247. One or more input and output devices can include a connector or port (not shown) suitable for charging a battery 1262 accessible from the outside of the frame 1232, a wireless receiver, transmitter, or transceiver (not shown), or a combination of such devices.

The glasses 1200 include digital cameras 1269. Although two cameras 1269 are depicted, other examples contemplate the use of a single or additional (i.e., more than two) cameras 1269. For ease of description, various features relating to the cameras 1269 will be described further with reference to only a single camera 1269, but it will be appreciated that these features can apply, in suitable examples, to both cameras 1269.

In various examples, the glasses 1200 may include any number of input sensors or peripheral devices in addition to the cameras 1269. The front piece 1233 is provided with an outward-facing, forward-facing, front, or outer surface 1266 that faces forward or away from the user when the glasses 1200 are mounted on the face of the user, and an opposite inward-facing, rearward-facing, rear, or inner surface 1267 that faces the face of the user when the glasses 1200 are mounted on the face of the user. Such sensors can include inward-facing video sensors or digital imaging modules such as cameras 1269 that can be mounted on or provided within the inner surface 1267 of the front piece 1233 or elsewhere on the frame 1232 so as to be facing the user, and outward-facing video sensors or digital imaging modules such as the cameras 1269 that can be mounted on or provided with the outer surface 1266 of the front piece 1233 or elsewhere on the frame 1232 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 1243, 1244 (or lenses) to provide a mixed reality or augmented reality experience for the user of the glasses 1200.

The glasses 1200 further include an example of a camera control mechanism or user input mechanism comprising a camera control button mounted on the frame 1232 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 1232 adjacent to its surface for detecting the presence of a user's finger, to dispose the touch-sensitive button to the engaged condition when the user touches a finger to the corresponding spot on the outer surface 1266 of the frame 1232. It will be appreciated that the above-described camera control button and capacitive touch button are but two examples of a haptic input mechanism for single-action control of the camera 1269, and that other examples may employ different single-action haptic control arrangements.

The computer 1261 is configured to perform the methods described herein. In some examples, the computer 1261 is coupled to one or more antennas for reception of signals from a GNSS and circuitry for processing the signals where the antennas and circuitry are housed in the glasses 1200. In some examples, the computer 1261 is coupled to one or more wireless antennas and circuitry for transmitting and receiving wireless signals where the antennas and circuitry are housed in the glasses 1200. In some examples, there are multiple sets of antennas and circuitry housed in the glasses 1200. In some examples, the antennas and circuitry are configured to operate in accordance with a communication protocol such as Bluetooth™, Low-energy Bluetooth™, IEEE 802, IEEE 802.11az/be, and so forth. In some examples, PDR sensors housed in glasses 1200 and coupled to the computer 1261. In some examples, the glasses 1200 are VR headsets where optical elements 1243, 1244 are opaque screens for displaying images to a user of the VR headset. In some examples, the computer 1261 is coupled to user interface elements such as slide or touchpad 1276 and button 1278. A long press of button 1278 resets the glasses 1200. The slide or touchpad 1276 and button 1278 are used for a user to provide input to the computer 1261 and/or other electronic components of the glasses 1200. The glasses 1200 include one or more microphones 1282 that are coupled to the computer 1261. The glasses 1200 include one or more gyroscopes 1280.

Figure 13:
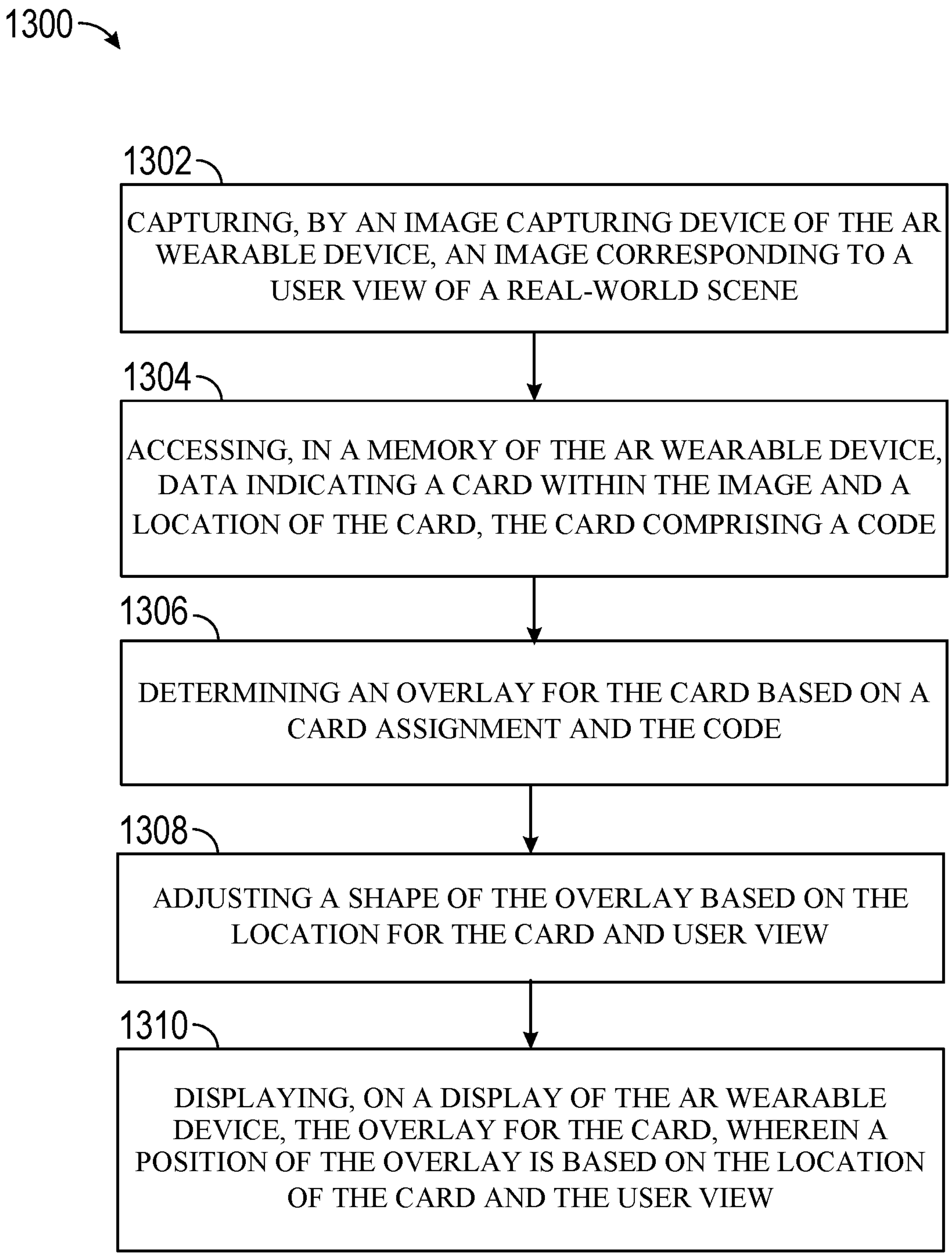
FIG. 13 illustrates a method for augmented reality card games, in accordance with some examples.

FIG. 13 illustrates a method 1300 for augmented reality card games, in accordance with some examples. The method 1300 begins at operation 1302 with capturing, by an image capturing device of the AR wearable device, an image corresponding to a user view of a real-world scene. For example, image capturing device 610 captures image 648 of a user view 609 of a real-world scene 680. The method 1300 continues at operation 1304 with accessing, in a memory of the AR wearable device, data indicating a card within the image and a location of the card, the card comprising a code. For example, detection module 666 detects the card 650 at location 646 with code 652. ML module 658 or ML module 688 determined the card 650, location 646, and code 652.

The method 1300 continues at operation 1306 with determining an overlay for the card based on a card assignment and the code. For example, AR graphics module 668 determines an overlay 644 for the card 650 based on the code 652 and the card assignment 624. The method 1300 continues at operation 1308 with adjusting a shape of the overlay based on the location for the card and user view. For example, AR graphics module 688 adjusts the overlay 644 based on the location 646 of the card 682 so that the overlay 644 covers at least one surface of the card 682 as seen by the user 698. The overlays 644 may be for more than one surface of the card 682.

The method 1300 continues at operation 1310 with displaying, on a display of the AR wearable device, the overlay for the card, wherein a position of the overlay is based on the location of the card and the user view. For example, the AR graphics module 668 displays the overlay 644 on the display 608 of the AR wearable device 602 to cover at least one surface of the card 682 based on the location 646 of the card 682 and the user view 609.

The method 1300 may include one or more additional operations. Operations of method 1300 may be performed in a different order. One or more of the operations of method 1300 may be optional. The method 1300 may be performed by the client device 102, system 600, an apparatus of the glasses 1200, or another electronic device. Portions of the functionality may be performed on a server computer or host computer. For example, glasses 1200 may be coupled to a host client device 102 or application server 114 where one or more of the operations are performed.

Some examples disclose methods of manufacturing the cards 682 with the codes 684. The method includes preparing a plurality of cards. For example, the cards 682 may be prepared by manufacturing the cards 682 to make them ready for printing. The method continues with printing a plurality of codes 684 on the plurality of cards 682, where a code 684 of the plurality of codes 684 printed on a corresponding card 682 of the plurality of cards 682 identifies the corresponding card 682 among the plurality of codes 682, and where the plurality of codes 684 are computer readable codes 682. For example, the cards 682 are printed with codes 682 that are only readable by a computer such as a QR code or bar code. In some examples, the cards 682 are printed as to manufacture the cards 682 as described herein. The method may further include refraining from printing other indicia of identity on the plurality of cards 682. For example, the cards 682 may not have other indicia such as a symbol of "King" printed on the card 682.

Machine Architecture

Figure 14:
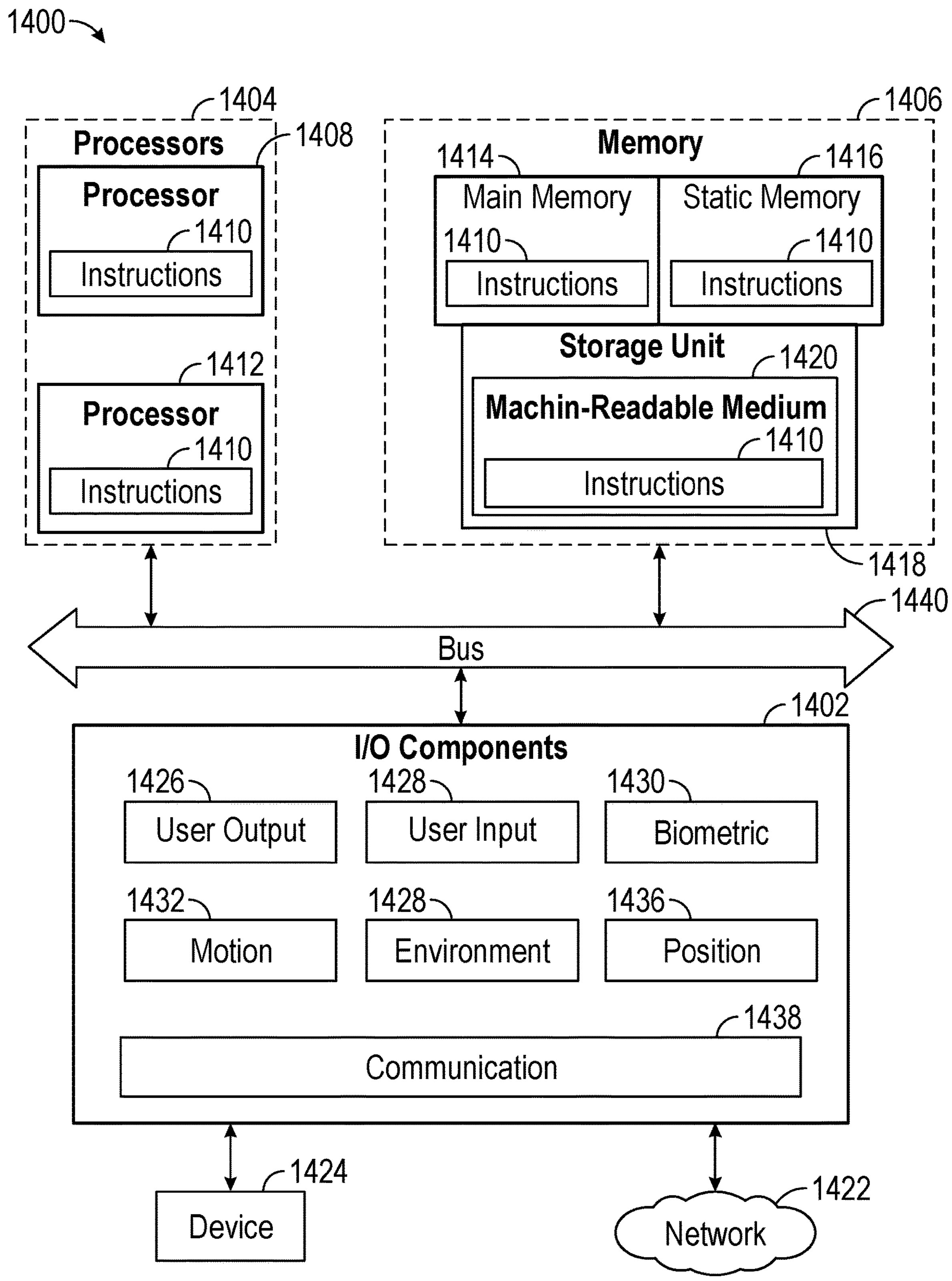
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the Processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NFC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

Software Architecture

Figure 15:
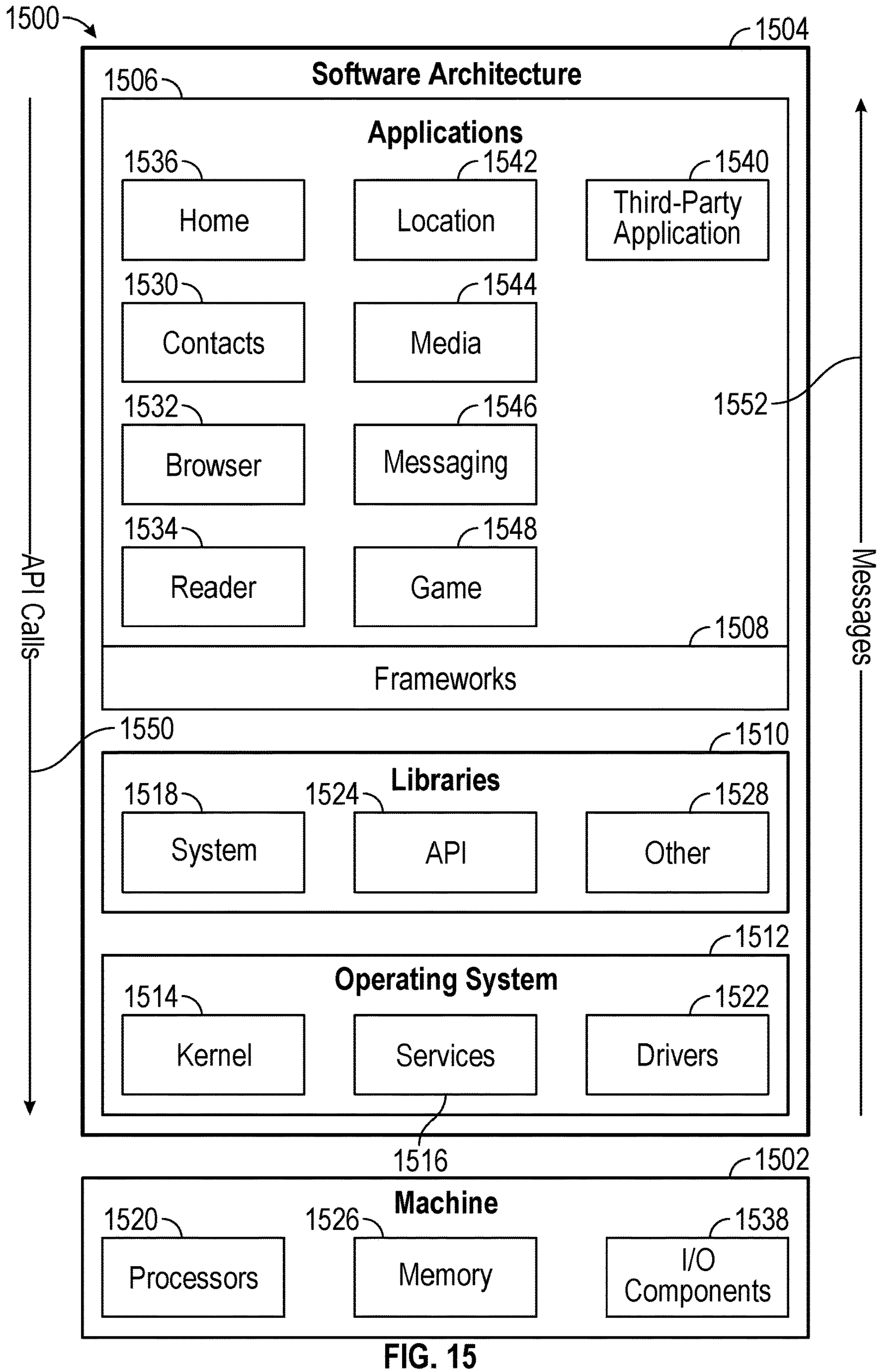
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
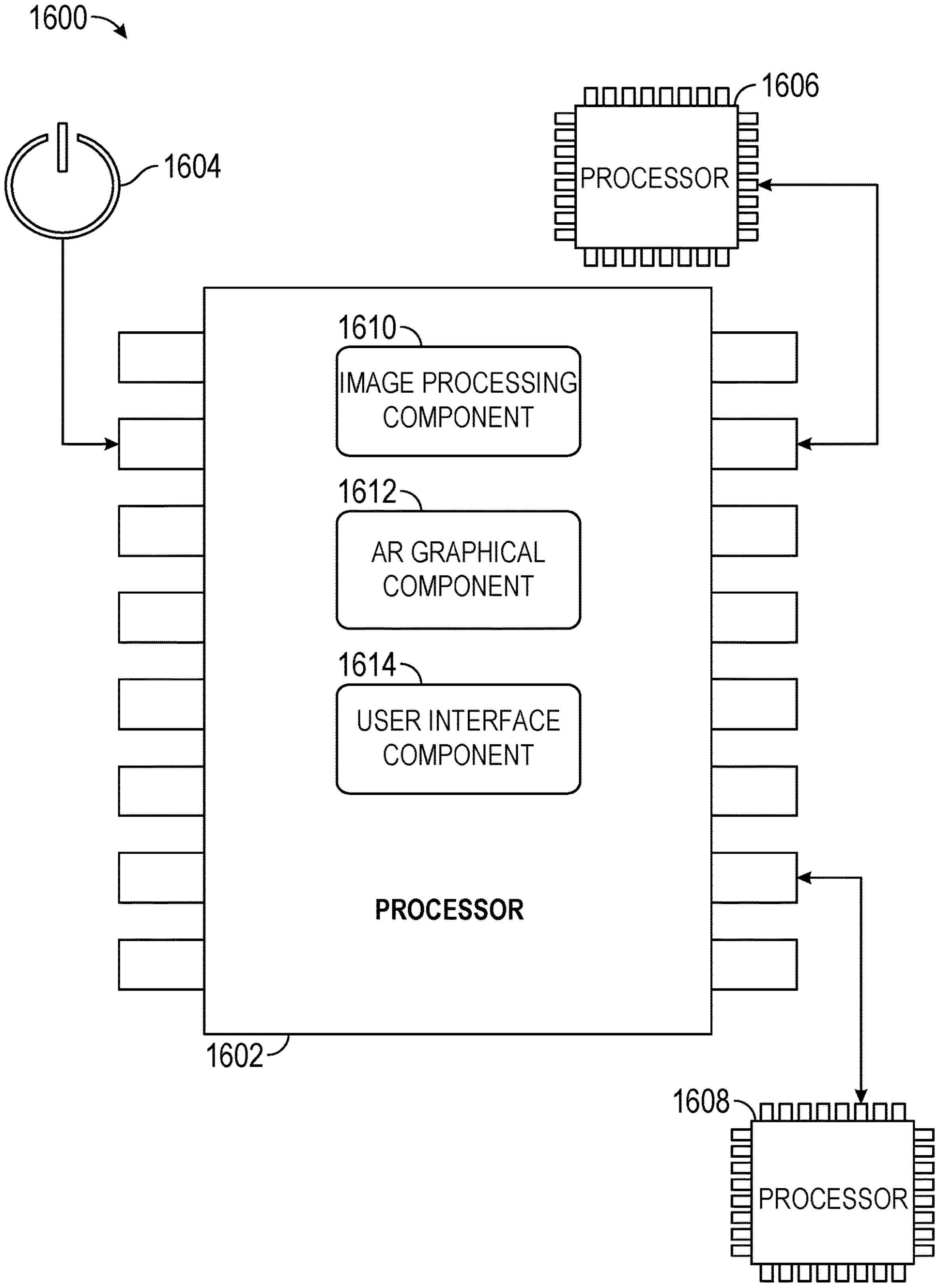
FIG. 16 is a diagrammatic representation of a processing environment, in accordance with some examples.

Turning now to FIG. 16, there is shown a diagrammatic representation of a processing environment 1600, which includes a processor 1602, a processor 1606, and a processor 1608 (e.g., a GPU, CPU or combination thereof).

The processor 1602 is shown to be coupled to a power source 1604, and to include (either permanently configured or temporarily instantiated) modules, namely an image processing component 1610, an AR graphical component 1612, and a user interface component 1614. The image processing component 1610 is invoked to process images

648 to determine cards 650 and other information regarding the cards 650 such as locations 646 and codes 652 of the cards 650. For example, the ML module 658 processes the images of the cards 650 to generate the locations 646 and codes 652 of the cards 650.

The AR graphical component 1612 displays overlays 644 over the cards 650. For example, the AR graphics module 668 displays overlays 644 over the cards 682 that are in the user view 609. The AR graphics module 668 adjusts the overlays 644 to fit on the cards 682 in accordance with the user view 609.

The user interface component 1614 interacts with the user 698 to determine the user intent 674 of the user 698. For example, the UI module 672 processes the haptic 601, gesture 603, voice 605, and position 607 input of user 698 to determine the user intent 674. The UI module 672 presents, on the display 608, a UI 677 including items 675 such as app carousel 1128. As illustrated, the processor 1602 is communicatively coupled to both the processor 1606 and the processor 1608.

Glossary

Certain examples are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example examples, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, an AR glasses, a VR glasses, an AR wearable device, a desktop computer, a laptop, a portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed on an augmented reality (AR) wearable device, the method comprising:

capturing, by an image capturing device of the AR wearable device, an image corresponding to a user view of a real-world scene;

accessing, in a memory of the AR wearable device, data indicating a card within the image and a location of the card, the card comprising a code;

receiving, from a host device via a wireless network, a card assignment generated by the host device for a game session, the card assignment dynamically mapping a plurality of codes printed on a plurality of cards to a plurality of overlays, selected from a plurality of games, wherein a same code of the plurality of codes is mapped to different overlays in different game sessions, each card of the plurality of cards comprising a different code;

determining an overlay for the card based on the card assignment and the code;

adjusting a shape of the overlay based on the location of the card and a user view; and displaying, on a display of the AR wearable device, the overlay for the card, wherein a position of the overlay is based on the location of the card and the user view, the overlay replacing a visual appearance of a face of the card as seen through the display of the AR wearable device.

2. The method of claim 1 further comprising:

determining a gesture performed by a user of the AR wearable device related to the card;

determining a rule associated with the gesture; and performing the rule.

3. The method of claim 2 wherein the gesture is play the card and the rule comprises:

in response to an end of hand condition, determine which user of a plurality of users, comprising the user, won a hand indicated by the end of hand condition, and adjusting a score.

4. The method of claim 2 wherein the gesture is play the card and the rule comprises:

in response to a card being incorrectly play condition, displaying on a display of the AR wearable device an indication that the card is being incorrectly played.

5. The method of claim 2 further comprising:

determining a gesture performed by the user is laying out a plurality of cards for a game; and in response to a number of the plurality of cards being a same number as a number of cards to play the game, determining a card assignment, wherein the card assignment assigns each of the plurality of cards an overlay of a plurality of overlays, and wherein each of the plurality of cards is identified based on each of the plurality of cards comprising a different code.

6. The method of claim 1 wherein the overlay is a video that the AR wearable device plays on the card, the overlay is an image, or the overlay is an animated image.

7. The method of claim 1 wherein the overlay is a first overlay and wherein the method further comprises:

in response to determining that a condition of a rule is satisfied, changing the first overlay to a second overlay.

8. The method of claim 1 wherein the code is on at least one face of the card or on at least one edge of the card.

9. The method of claim 1 further comprising:

receiving an indication of a selection of a game from a user of the AR wearable device;

downloading the game, the game comprising the overlay; and running the game.

10. The method of claim 9 wherein the user is a first user and the AR wearable device is a first AR wearable device, and wherein the method further comprises:

receiving from a second AR wearable device an indication of a request from a second user to join the game; and adding the second user and the second AR wearable device to the game.

11. The method of claim 10 further comprising:

sending the card assignment to the second AR wearable device.

12. The method of claim 11 wherein the user played the card and wherein the method further comprises:

sending to the second AR wearable device an indication that the user played the card and an indication of the code.

13. The method of claim 1 further comprising:

sending an indication to join a game to a computing device;

receiving an acceptance to join the game from the computing device; and running the game comprising the overlay.

14. An augmented reality (AR) wearable device comprising:

at least one processor; and a memory storing instructions that, when executed by the at least one processor, configure the AR wearable device to perform operations comprising:

capturing, by an image capturing device of the AR wearable device, an image corresponding to a user view of a real-world scene;

accessing, in a memory of the AR wearable device, data indicating a card within the image and a location of the card, the card comprising a code;

receiving, from a host device via a wireless network, a card assignment generated by the host device for a game session, the card assignment dynamically mapping a plurality of codes printed on a plurality of cards to a plurality of overlays, selected from a plurality of games, wherein a same code of the plurality of codes is mapped to different overlays in different game sessions, each card of the plurality of cards comprising a different code;

determining an overlay for the card based on the card assignment and the code;

adjusting a shape of the overlay based on the location of the card and a user view; and displaying, on a display of the AR wearable device, the overlay for the card, wherein a position of the overlay is based on the location of the card and the user view, the overlay replacing a visual appearance of a face of the card as seen through the display of the AR wearable device.

15. The AR wearable device of claim 14 wherein the operations further comprise:

determining a gesture performed by a user of the AR wearable device related to the card;

determining a rule associated with the gesture; and performing the rule.

16. The AR wearable device of claim 15 wherein the gesture is play the card and the rule comprises:

in response to an end of hand condition, determine which user of a plurality of users, comprising the user, won a hand indicated by the end of hand condition, and adjust a score.

17. The AR wearable device of claim 15 wherein the gesture is play the card and the rule comprises:

In response to a card being incorrectly play condition, displaying on a display of the AR wearable device an indication that the card is being incorrectly played.

18. The AR wearable device of claim 17 wherein the operations further comprise:

determining a gesture performed by the user is laying out a plurality of cards for a game; and in response to a number of the plurality of cards being a same number as a number of cards to play the game, determining a card assignment, wherein the card assignment assigns each of the plurality of cards an overlay of a plurality of overlay, and wherein each of the plurality of cards is identified based on each of the plurality of cards comprising a different code.

19. A non-transitory computer-readable storage medium that stores instructions for execution by at least one processor of an augmented reality (AR) wearable device, the instructions to configure the at least one processor to:

capturing, by an image capturing device of the AR wearable device, an image corresponding to a user view of a real-world scene;

accessing, in a memory of the AR wearable device, data indicating a card within the image and a location of the card, the card comprising a code;

receiving, from a host device via a wireless network, a card assignment generated by the host device for a game session, the card assignment dynamically mapping a plurality of codes printed on a plurality of cards to a plurality of overlays, selected from a plurality of games, wherein a same code of the plurality of codes is mapped to different overlays in different game sessions, each card of the plurality of cards comprising a different code;

determining an overlay for the card based on the card assignment and the code;

adjusting a shape of the overlay based on the location of the card and a user view; and displaying, on a display of the AR wearable device, the overlay for the card, wherein a position of the overlay is based on the location of the card and the user view, the overlay replacing a visual appearance of a face of the card as seen through the display of the AR wearable device.

20. The non-transitory computer-readable storage medium of claim 19, wherein the at least one processor is further configured to:

determining a gesture performed by a user of the AR wearable device related to the card;

determining a rule associated with the gesture; and performing the rule.

* * * * *